US 6,693,758 B2

(12) United States Patent
Patterson et al.

(10) Patent No.: US 6,693,758 B2
(45) Date of Patent: Feb. 17, 2004

(54) TAPE CARTRIDGE TRANSPORT MAGAZINE FOR AN AUTOMATED TAPE CARTRIDGE AUTOLOADER/LIBRARY SYSTEM

(75) Inventors: Scott Ryan Patterson, Manitou Springs, CO (US); Paddy Eliot Collins, Colorado Springs, CO (US); Ryan Stuart Porter, Monument, CO (US); Peter A. Johnson, Black Forest, CO (US); Alexander Chan, Colorado Springs, CO (US); Kim M. Thomas, Colorado Springs, CO (US); Christopher Lee Felton, Colorado Springs, CO (US); David Ray Berry, Colorado Springs, CO (US); Thua Nang Dai, Colorado Springs, CO (US); Dominic John Maglin, Pueblo, CO (US); Theodore James Oade, Colorado Springs, CO (US); Gary Eugene Sadler, Colorado Springs, CO (US); Sam Wen, Superior, CO (US); John C. Owens, Arvada, CO (US)

(73) Assignee: Quantum Corporation, San Jose, CA (US)

(*) Notice: Subject to any disclaimer, the term of this patent is extended or adjusted under 35 U.S.C. 154(b) by 0 days.

(21) Appl. No.: 09/893,328

(22) Filed: Jun. 27, 2001

(65) Prior Publication Data

US 2002/0057514 A1 May 16, 2002

Related U.S. Application Data

(63) Continuation of application No. 09/710,645, filed on Nov. 10, 2000.

(51) Int. Cl.[7] ............................ G11B 17/00; G11B 15/68
(52) U.S. Cl. ............................ 360/69; 360/92; 414/932
(58) Field of Search ................... 360/69, 92, 98.01, 360/98.04, 71; 369/30.42, 30.5, 30.68, 30.7, 30.71, 30.72, 30.83, 30.85, 30.86; 242/337; 414/932

(56) References Cited

U.S. PATENT DOCUMENTS

| 4,063,294 A | 12/1977 | Burkhart ................. 360/92 |
| 5,449,091 A | 9/1995 | Dalziel ................... 221/81 |
| 5,515,213 A | 5/1996 | Elliott .................... 360/92 |
| 5,682,276 A | 10/1997 | Hinnen et al. ........... 360/92 |
| 5,746,385 A | 5/1998 | Leger et al. ........... 242/337 |

(List continued on next page.)

FOREIGN PATENT DOCUMENTS

WO    WO 89/08311    8/1989

OTHER PUBLICATIONS

Material from Worldwide Web @ www.m4data–usa.com/products/magfile_1.html.

Primary Examiner—Andrew L. Sniezek
(74) Attorney, Agent, or Firm—Morrison & Foerster LLP

(57) ABSTRACT

The tape cartridge transport magazine receives and stores tape cartridges in a horizontal orientation relative to the tape cartridge transport magazine to achieve a substantially smaller form factor. Once loaded into the magazine, the tape cartridges are shuffled in a vertical closed loop within the magazine so that any one of the tape cartridges can be positioned for selection by a cartridge picker. During shuffling within the magazine, individual tape cartridges are not flipped or reoriented, but remain properly oriented for selection by the cartridge picker. When used with a tape cartridge autoloader/library system as disclosed herein, a pair of interchangeable magazines can be utilized to store and provide tape cartridges for selection by a rotating cartridge picker.

35 Claims, 22 Drawing Sheets

U.S. PATENT DOCUMENTS

| | | |
|---|---|---|
| 5,752,668 A | 5/1998 | Patterson et al. ............ 242/337 |
| 5,760,995 A | 6/1998 | Heller et al. ................... 360/92 |
| 5,793,564 A * | 8/1998 | Nakase et al. ................ 360/92 |
| 5,847,897 A | 12/1998 | Marlowe ...................... 360/92 |
| 5,856,894 A | 1/1999 | Marlowe ...................... 360/92 |
| 5,959,083 A | 9/1999 | Okamoto et al. .............. 360/92 |
| 5,975,450 A | 11/1999 | Leger et al. ................. 242/337 |
| 5,999,356 A * | 12/1999 | Dimitri et al. ................ 360/71 |
| 6,097,566 A | 8/2000 | Heller et al. ................... 360/92 |
| 6,130,800 A | 10/2000 | Ostwald ....................... 360/92 |

* cited by examiner

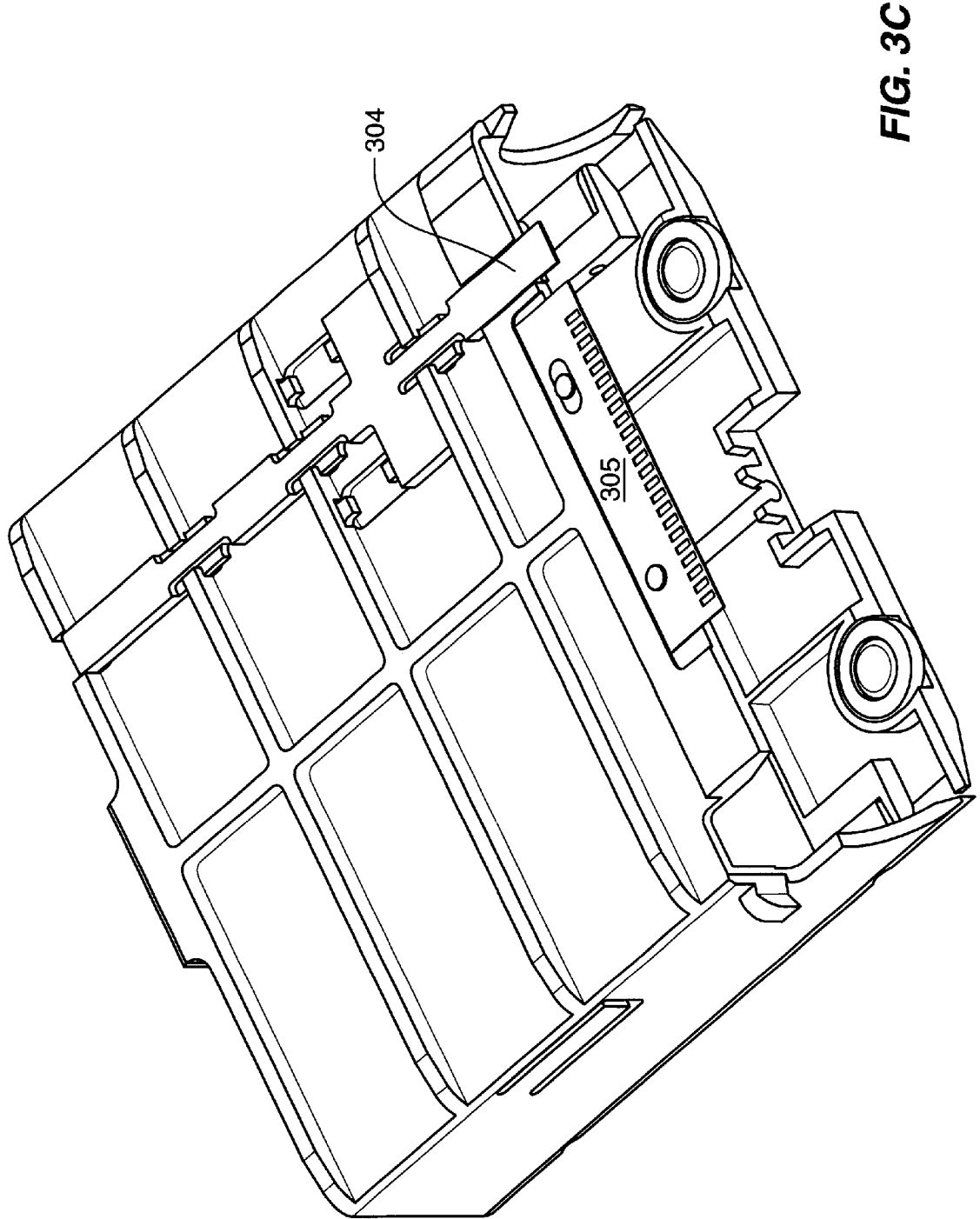

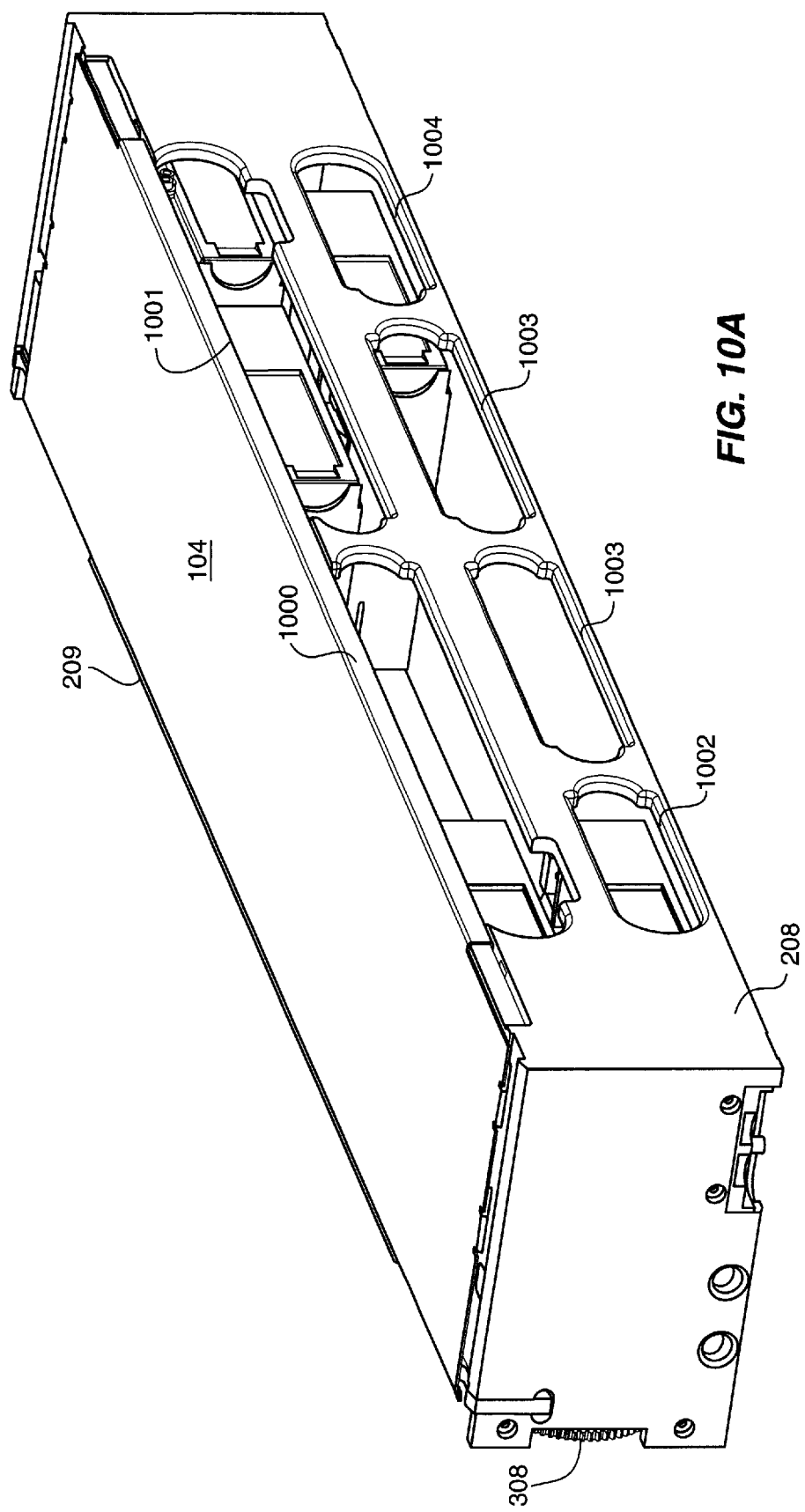

TAPE CARTRIDGE TRANSPORT MAGAZINE FOR AN AUTOMATED TAPE CARTRIDGE AUTOLOADER/LIBRARY SYSTEM

RELATED APPLICATIONS

This application is a continuation of U.S. patent application Ser. No. 09/710,645 filed on Nov. 10, 2000, pending titled "Automated Tape Cartridge Autoloader/Library System," and which is incorporated herein by reference in its entirety.

FIELD OF THE INVENTION

The invention is related to the field of data storage, and in particular, to a tape cartridge transport magazine that stores and shuffles tape cartridges in a vertical closed loop within the magazine to position tape cartridges for selection by a cartridge picker in a tape library.

BACKGROUND

A popular device for handling large amounts of information in a data processing system is an automated tape cartridge library. Tape cartridge libraries store and manage multiple tape cartridges containing magnetic tape media on which data is stored. Tape cartridge libraries typically include a plurality of fixed tape cartridge storage locations, at least one read/write tape drive, and a tape cartridge retrieval/transport mechanism, known in the art as a "cartridge picker."

Cartridge pickers automatically exchange individual tape cartridges between the storage locations and the tape drive(s). One example of a cartridge picker includes a rotatable robotic arm with an optical sensor for selecting and retrieving a tape cartridge and transporting the tape cartridge to the tape drive(s). Another example of a cartridge about a pivot in a rotary motion to select, retrieve, and transport tape cartridges to the tape drive(s).

The tape drive(s) is typically mounted within or juxtaposed to the tape cartridge library. The tape drive(s) is operable to read/write data to or from the magnetic tape media in the tape cartridge. A host computer communicates with a library control unit and the tape drive(s) to control the operation of the tape cartridge library.

Unfortunately, tape cartridge libraries suffer from numerous drawbacks. One major drawback is their overall size, primarily due to the necessity of storing a large number of tape cartridges. In tape libraries, the tape cartridge storage locations are arranged in predetermined arrays of uniquely identified cells with each cell containing a single tape cartridge. In some cases, the array of cells is configured in a bookshelf arrangement. This type of arrangement, however, requires the use of a multi-axis cartridge picker that translates along an x, y, and/or z axis to exchange individual tape cartridges with the tape drive(s).

In other cases, such as disclosed in U.S. Pat. No. 5,847,897, the array of cells are vertically oriented in a carousel style cartridge magazine that rotates about a central axis to position tape cartridges for selection by a stationary cartridge picker. Unfortunately, the vertical orientation of the tape cartridges in the magazine, while necessary to the operation of the carousel, and use of a stationary cartridge picker, significantly adds to the overall height of the library. Additionally, the vertical orientation of the tape cartridges requires that the tape drive(s) also be vertically oriented to permit the picker to pass a tape cartridge from the magazine to the drive without a complicated re-orientation of the cartridge, further increasing the form factor size of the of the library.

SUMMARY

The present invention solves the problems outlined above and advances the art by providing a tape cartridge transport magazine for a tape cartridge library, termed tape cartridge autoloader/library system herein. The tape cartridge transport magazine receives and stores tape cartridges in a horizontal orientation relative to the tape cartridge transport magazine to achieve a substantially smaller form factor of the tape cartridge autoloader/library system. Additionally, once loaded into the magazine, the tape cartridges are shuffled in a vertical closed loop between a top portion and a bottom portion of the magazine so that any tape cartridge within the magazine can be positioned for selection by the cartridge picker. When used with a tape cartridge autoloader/library system as disclosed herein, a pair of interchangeable magazines can be utilized to store and provide tape cartridges to a rotating cartridge picker.

A first advantage of the present tape cartridge transport magazine is that the horizontal orientation of the cartridges in the magazine permits construction of a tape cartridge autoloader/library system in a substantially smaller form factor. An autoloader/library system configured with one or more of the present magazines is architected such that the components therein are substantially coplanar. In one example, an autoloader/library system can be constructed that measures less than three and one half inches in height and fits in a standard rack mount cabinet. A second advantage of the present tape cartridge transport magazine is that the use of the vertical closed loop transport mechanism to position tape cartridges for selection by the cartridge picker limits the travel required for the exchange of tape cartridges between the magazines and the tape drive(s). In prior art systems, the cartridge picker must move to the storage location of a desired tape cartridge, select the tape cartridge from the storage location, move to the location of the tape drive and load the tape cartridge into the tape drive. As one skilled in the art will greatly appreciate, these operations are time consuming and require the use of complex mechanisms to move the cartridge picker within the autoloader/library system. In contrast, the present cartridge picker is permitted to simply rotate between the magazine(s) and at least one tape drive, while desired cartridges are delivered by the magazine(s) to the cartridge picker. Advantageously, this provides for a fast and efficient exchange and inventory of tape cartridges within an autoloader/library system. A third advantage of the present tape cartridge transport magazine is that its operation is independent of other components in the autoloader/library system. The magazine(s) can be inventorying or queuing cartridges for retrieval by the picker while the picker shuttles tape cartridges between various locations in the autoloader/library system and the one or more tape drives read and write data to a tape cartridge. A fourth advantage of the present tape cartridge transport magazine is that where multiple magazines are used, the magazines are interchangeable so that any one of the multiple magazines will interface with any one of multiple magazine ports.

DESCRIPTION OF THE DRAWINGS

FIG. 3c illustrates a bottom perspective view of the carriage for the tape cartridge transport magazine according to the present invention

FIG. 10a illustrates a front perspective view of the tape cartridge transport magazine according to the present invention with the handle removed;

DETAILED DESCRIPTION

Figure 1:
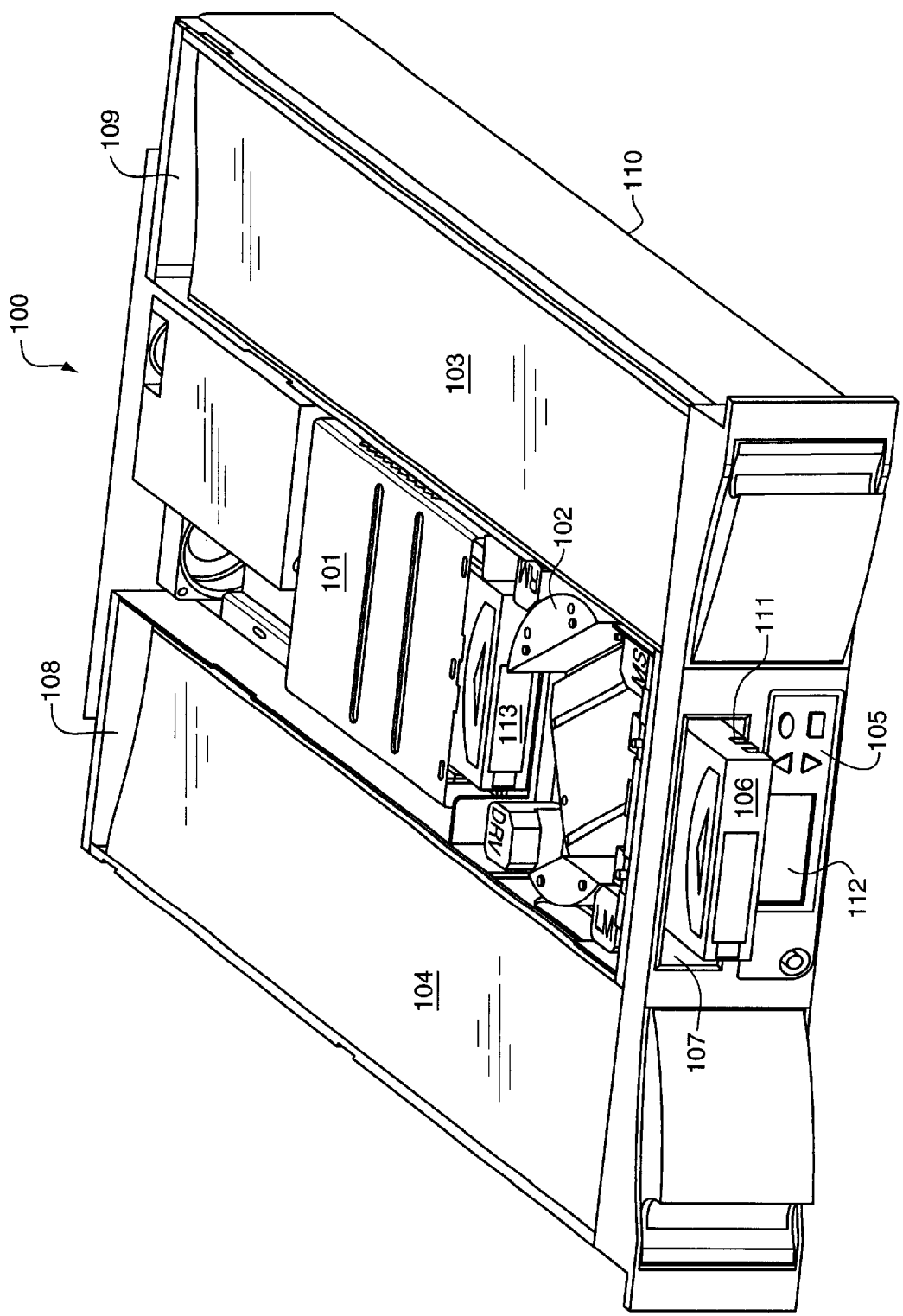
FIG. 1 illustrates an example of a tape cartridge autoloader/library system configured with multiple tape cartridge transport magazines according to the present invention.

Automated Tape Cartridge Autoloader/Library System—FIG. 1

For purposes of illustration and not of limitation, various features and advantages of the present tape cartridge transport magazine will now be described within the context of an autoloader/library system configured to accommodate a plurality of tape cartridges. It is to be understood that the following description with respect to the example of an autoloader/library system disclosed herein is not intended to limit the scope of the present invention. It would be obvious to one skilled in the art that the principles of the present invention could easily be applied to other tape libraries, autoloaders, and autoloader/library systems.

FIG. 1 depicts an example of an automated tape cartridge autoloader/library system 100 configured with tape cartridge transport magazines, 103 and 104, according to the present invention. The primary components of the autoloader/library system 100 are a read/write tape drive 101, a tape cartridge picker 102, a single tape cartridge interface 107, and the pair of tape cartridge transport magazines, 103 and 104, enclosed in a housing 110. The autoloader/library system 100 also includes a control panel 105 that receives control inputs from an operator and a user interface 112 to provide status information to the operator.

The autoloader/library system 100 is a complete tape cartridge library that stores, manages, and automatically exchanges a plurality of tape cartridges, e.g. 106 and 113, between the tape drive 101, the single cartridge interface 107, and the tape cartridge transport magazines, 103 and 104. The autoloader/library system 100 could also include multiple tape drives and could be configured to accommodate multiple tape media formats as a matter of design choice by simply incorporating the appropriate tape drive format into the autoloader/library system 100. Some examples of the tape cartridge media 106 include without limitation, DLT, LTO, 8 millimeter, and SDLT tape cartridges.

The autoloader/library system 100 includes a compact form factor, largely due to the tape cartridge transport magazines, 103 and 104, of the present invention. In one example of the autoloader/library system 100, the housing 110 including the tape cartridge transport magazines, 103 and 104, the tape drive 101, the cartridge picker 102, and all control elements including motors, circuitry, and processors, measures approximately 3.75 inches in height and fits into a standard rack mount.

The autoloader/library system 100 functions as a traditional tape cartridge library system where the plurality of tape cartridges, e.g. 106, are stored in the magazines, 103 and 104, and are managed by the autoloader/library system 100. The autoloader/library system 100 also functions to present a plurality of scratch (blank) tapes to the tape drive 101 for the writing of data thereon. In this latter application, the magazines, 103 and 104, function to queue the plurality of scratch tapes for the cartridge picker 102 so that data can be written on each of the scratch tapes without the necessity of an operator having to manually load scratch tapes into the tape drive 101.

The autoloader/library system 100 is also configured to mechanically and electrically interconnect with other substantially identical autoloader/library systems by stacking multiple autoloader/library systems to provide expandability and scalability as a matter of design choice. Once stacked, the multiple autoloader/library systems could each include their own tape cartridge transport magazines, 103 and 104, tape drive 101, and cartridge picker 102, or could share elements such as the tape cartridge transport magazines, tape drives, and cartridge pickers. In addition, stacked autoloader/library systems can also share tape cartridges to provide efficient load balancing and operation.

The single tape cartridge interface 107 receives individual tape cartridges, e.g. 106, from an operator so that the tape cartridges can be stored in one of the cartridge transport magazines, 103 and 104 or presented to the tape drive 101. The single cartridge interface 107 is also used to eject tape cartridges from the autoloader/library system 100 to the operator.

The tape cartridge transport magazines, 103 and 104, are each configured to receive and store a plurality of individual tape cartridges, e.g. 106 and 113, in a plurality of individual tape cartridge storage locations. The magazines, 103 and 104, can receive the tape cartridges from the single cartridge interface 107 or be removed from the autoloader/library system and loaded with tape cartridges by an operator. The cartridge picker 102 rotates to position the cartridge picker 102 to exchange the individual tape cartridges, e.g. 106 and 113, with the tape drive 101, the tape cartridge transport magazines, 103 and 104, and the single tape cartridge interface 107. The tape cartridge transport magazines, 103 and 104, transport the individual tape cartridges, e.g. 106, in a vertical closed loop within the tape cartridge transport magazines, 103 and 104, so that any one of the individual tape cartridges can be positioned for selection by the cartridge picker 102. Advantageously, the use of the transport mechanisms in the tape cartridge transport magazines, 103 and 104, significantly limits the travel required for the cartridge picker 102. For example, rather than move to the location of a desired tape cartridge 106, select the tape cartridge 106, and then move to the location of the tape drive 101, the cartridge picker 102 simply rotates in a stationary picker base to position for the exchange of individual tape cartridges. The individual tape cartridges are in turn, delivered to the cartridge picker 102 by the tape cartridge transport magazines, 103 and 104. The cartridge picker 102 also rotates between the single cartridge interface 107 and the tape drive 101 to exchange tape cartridges, e.g. 106. Advantageously, the autoloader/library system 100, configured with the present magazines, 103 and 104, provides fast and efficient exchange and inventory of tape cartridges.

The transport mechanisms in the magazines, 103 and 104, permit the magazines, 103 and 104, the tape drive 101, the single cartridge interface 107, and the picker 102 to be coplanar within the autoloader/library system 100 to facilitate the compact form factor. Still yet another advantage of the present magazines, 103 and 104, is that the tape cartridges, e.g. 106, are not flipped or re-oriented during transport within the vertical closed loop, but are always maintained in the proper orientation for retrieval by the cartridge picker 102 and for presentation to the tape drive 101, single cartridge interface 107, or another tape cartridge transport magazine.

Once selected by the cartridge picker 102, the individual tape cartridge, e.g. 106, could be provided to one of the following locations depending on the desired operation to be performed. If a read/write operation is desired, the cartridge picker 102 could provide the selected tape cartridge 106 to the tape drive 101. If an ejection operation is desired, the cartridge picker 102 could provide the selected tape cartridge 106 to the single cartridge interface 107 for retrieval by an operator. If a load balancing operation is desired, the cartridge picker 102 could exchange the tape cartridge 106 between the tape cartridge transport magazine 103 and the tape cartridge transport magazine 104. The cartridge picker 102 could also provide the selected tape cartridge 106 to another tape cartridge transport magazine in another coupled autoloader/library system. Finally, the cartridge picker 102 could provide the selected tape cartridge, e.g. 106, to another tape drive in the coupled autoloader/library system.

The Tape Cartridge Transport Magazine

Figure 2:
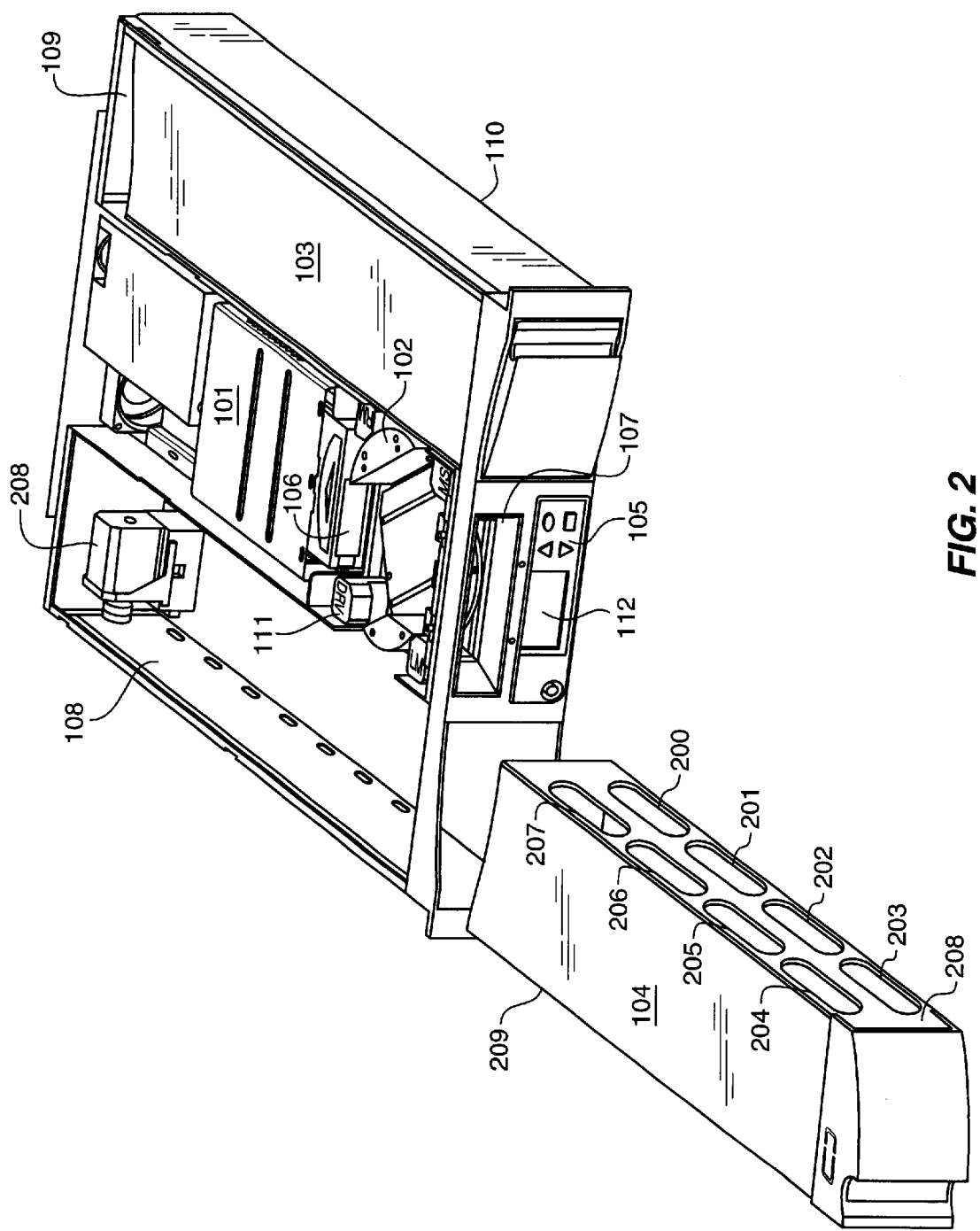
FIG. 2 illustrates an example of a tape cartridge autoloader/library system with a tape cartridge transport magazine according to the present invention in an ejected position.

The following description is primarily in reference to the tape cartridge transport magazine 104 but is equally applicable to the tape cartridge transport magazine 103. FIG. 2 depicts the autoloader/library system 100 with the tape cartridge transport magazine 104 in the ejected position.

The tape cartridge transport magazine 104 is designed to receive a plurality of tape cartridges, e.g. 106, in a plurality of storage locations 200–207 contained in a rectangular housing 209. These storage locations 200–207 are "virtual" storage locations in that they are not physically delimited spaces within the tape cartridge transport magazine 104, but are representative of the position of the tape cartridges within the magazine 104 when the magazine 104 is equipped with a full complement of tape cartridges. Therefore, the illustration of FIG. 2 is where eight cartridges are loaded in tape cartridge transport magazine 104 and oriented with four cartridges in a top row, above four cartridges in a bottom row. It should be noted that while the tape cartridge transport magazine 104 is shown with eight storage locations 200–207, the magazines, 103 and 104, could be configured with more or less than the eight storage locations as a matter of design choice and type of tape cartridge accommodated. Additionally, it is not necessary that both the tape cartridge transport magazines, 103 and 104, have the same number of storage locations 200–207. One of the tape cartridge transport magazines, 103 and 104, could contain more or less storage locations than the other one of the tape cartridge transport magazine, 103 and 104. Finally, one of the tape cartridge transport magazines, 103 and 104, could be configured for one type of tape media, e.g. DLT tape media, while the other one of the tape cartridge transport magazines, 103 and 104, could be configured for another type of tape media, e.g. LTO tape media. Those skilled in the art will appreciate that this would require that additional tape drives of the appropriate format be included in the autoloader/library system 100.

The face of the tape cartridge transport magazine 104 includes a cover plate 208 in which is formed apertures that correspond to storage locations 200–207. Those skilled in the art will appreciate however, that the cover plate 208 may include more or less apertures as a matter of design choice so long as a single aperture is located opposite the cartridge picker 102, since this is the cartridge retrieval location. For example, the cover plate 208 could include an aperture configuration as shown in FIG. 10a, depicting apertures 1000–1004. Additionally, a slidable cover to reduce the possibility of the introduction of environmental contaminants into the tape cartridge transport magazine 104 may also be used to seal the aperture(s).

Figure 9:
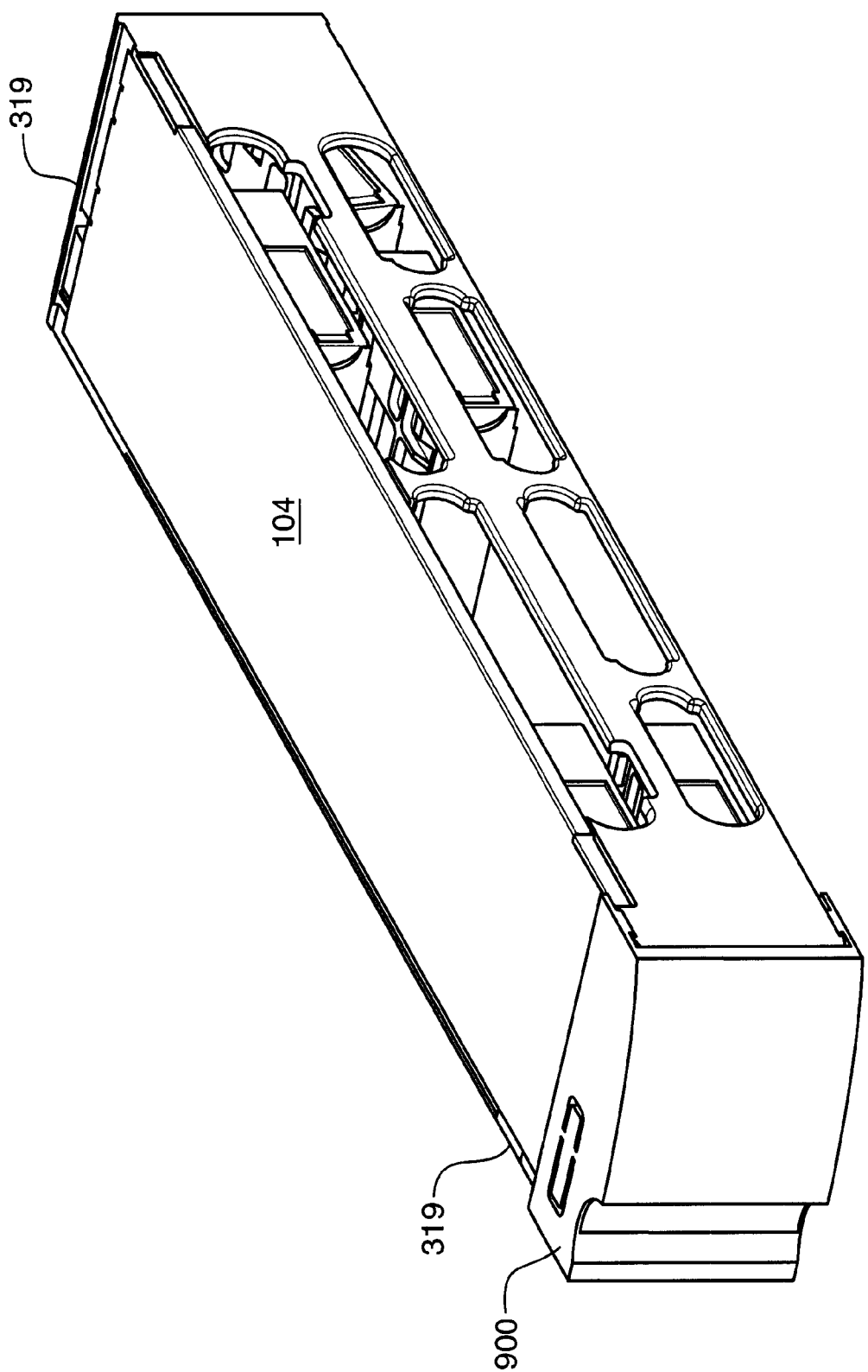
FIG. 9 illustrates a front perspective view of the tape cartridge transport magazine according to the present invention.

The tape cartridge transport magazine 104 is configured to slidably interface with a magazine port 108 in the housing 110. The tape cartridge transport magazine 103 is configured to slidably interface with a magazine port 109 in the housing 110. Additionally, the tape cartridge transport magazines, 103 and 104, are interchangeable so that the tape cartridge transport magazine 104 can be used in the magazine port 109 and the tape cartridge transport magazine 103 can be used in the magazine port 108. To maintain proper orientation of the tape cartridges in the magazine 104 with respect to the picker 102, it is necessary to flip the magazine 104 so that the opposing end of the magazine 104 can be inserted into the magazine port 109. This is accomplished by removing plastic handle 900 (shown in FIG. 9) from one end 319 of the magazine 104 and reconnecting the handle 900 to the opposing end 320 of the magazine 104. The handle 900 is configured to attach to either end 319 or end 320 of the magazine 104, and permits the magazine 104 to be flipped for insertion into the opposite magazine port, in this case port 109.

Transport Mechanism FIGS. 3–10

Figure 3A:
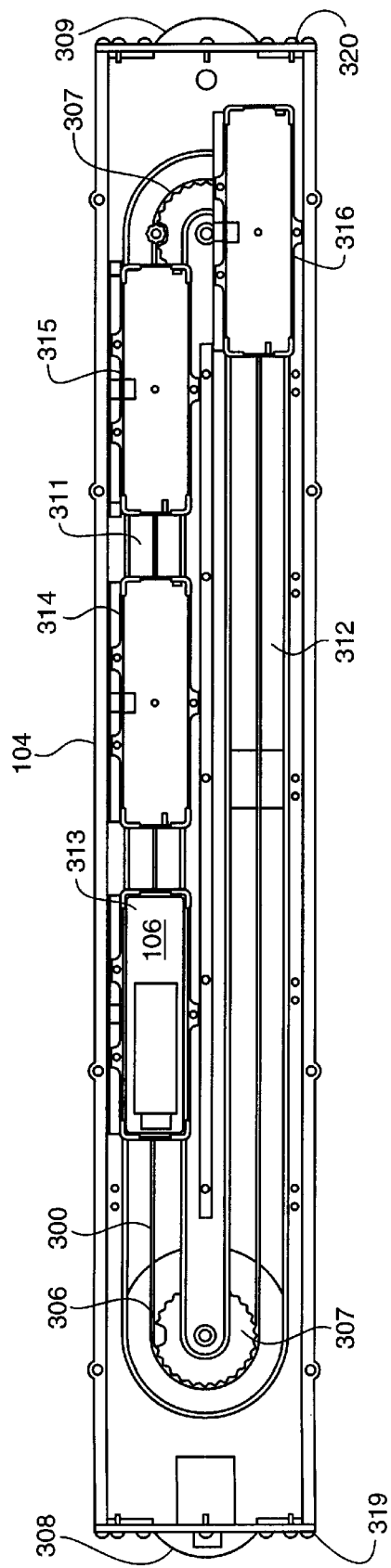
FIG. 3a illustrates a cross sectional view of the tape cartridge transport magazine according to the present invention.
Figure 3B:
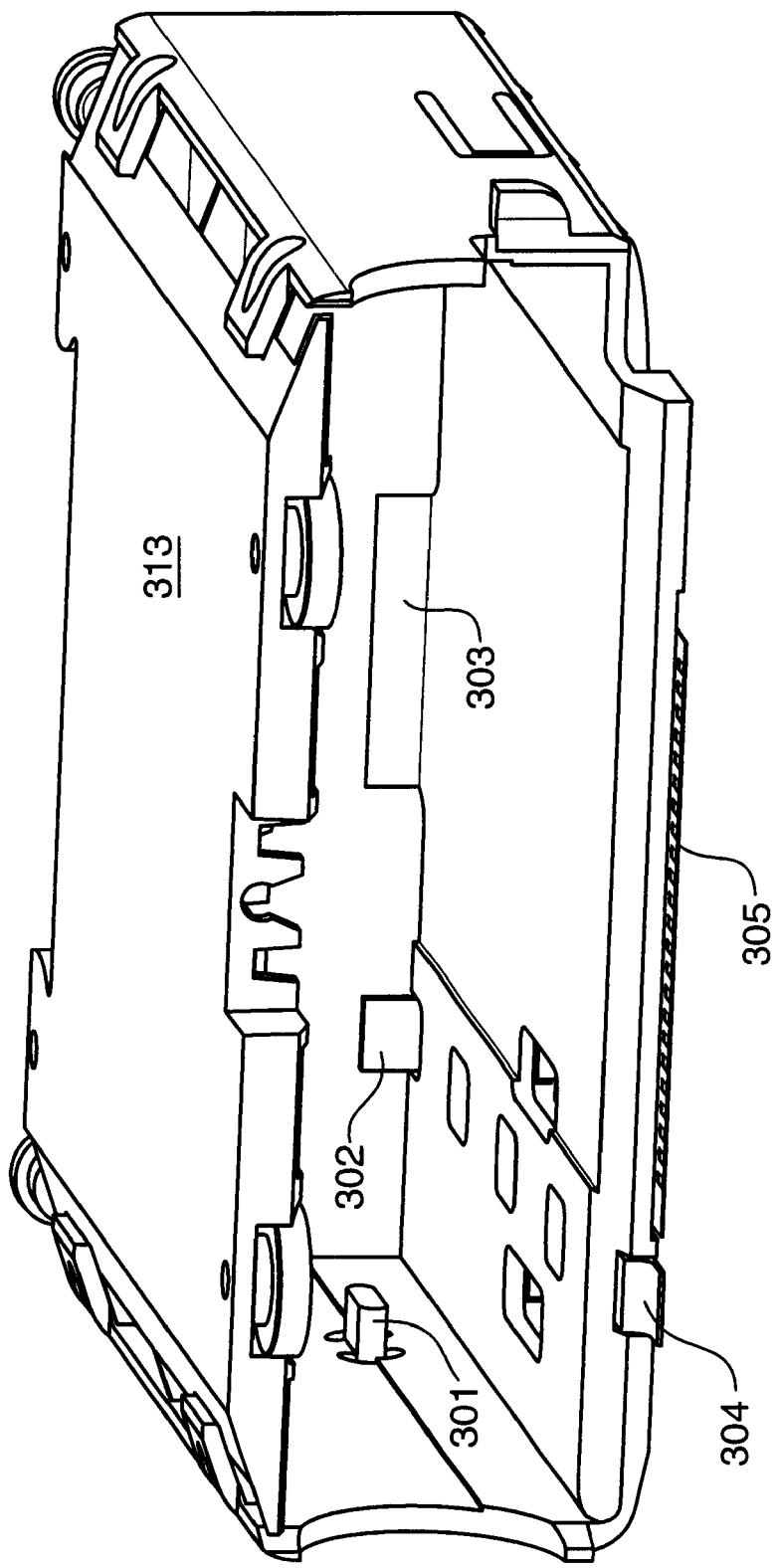
FIG. 3b illustrates a front perspective view of a carriage for the tape cartridge transport magazine according to the present invention.

Referring first to FIGS. 3a, 3b, and 3c, the plurality of tape cartridges, e.g. 106, are loaded into the tape cartridge transport magazine 104 by sliding the individual tape cartridges into individual carriages 313–316. The carriages 313–316 are oriented in a horizontal relationship relative to the magazine 104. Those skilled in the art will appreciate that only carriages 313–316 are shown on FIG. 3a and additional carriages are omitted for clarity. Furthermore, carriages 314–316 are shown empty, while carriage 313 is shown with the tape cartridge 106. The following description is primarily related to carriage 313 but applies equally to carriages 314–316.

Referring to FIG. 3b, the carriage 313 is a four-sided rectangular housing with an open back and an open front. The open front permits insertion of the tape cartridge 106. A key 301 that mates with a corresponding feature on the tape cartridge 106 prevents the tape cartridge 106 from being inserted into the carriage 313 in other than the proper orientation. A cartridge present switch 302 in the back of the carriage 313 indicates to the autoloader/library system 100 when a cartridge is present in carriage 313. The cartridge present switch 302 is triggered by the insertion of the cartridge 106 into the carriage 313. When the cartridge 106 is inserted, the cartridge present switch 302 is pushed back toward the rear of the carriage 313 until the cartridge 106 comes to rest against a stop 303 in the back of the carriage 313. As the cartridge present switch 302 is pushed toward the rear of the carriage 313, a flag 304 is retracted into the underside of the carriage 313. Operationally, a sensor in the autoloader/library system 100 senses the presence or absence of the flag 304, during an inventory operation, to determine if the cartridge 106 is present in the carriage 313. Because of its position, the sensor cannot detect the flag 304 in the retracted position. Thus, if the sensor detects the flag 304 (the flag is not retracted) a carriage empty condition is indicated. If the sensor does not detect the flag 304 a cartridge present condition is indicated.

The tape cartridge transport magazine 104 transports the carriages 313–316 including the individual cartridges, e.g. 106, in a closed vertical loop between a top portion 311 and a bottom portion 312 of the magazine 104. A motor driven transport system moves carriages 313–316 to the different storage locations 200–207. The transport system comprises a belt 300 connected to each of the carriages 313–316. A gear assembly operates to rotate the belt 300 and transport the carriages 313–316 around the vertical loop. The carriages 313–316 are positioned at the storage locations 200–207 using a pair of sensors located in the autoloader/library system 100 and a perforated tab, as exemplified by tab 305 on carriage 313. Operationally, a first sensor detects the presence of the carriage 313 as the tab 305 passes over the first sensor and a second sensor uses the perforations to precisely position the carriage 313

Figure 4:
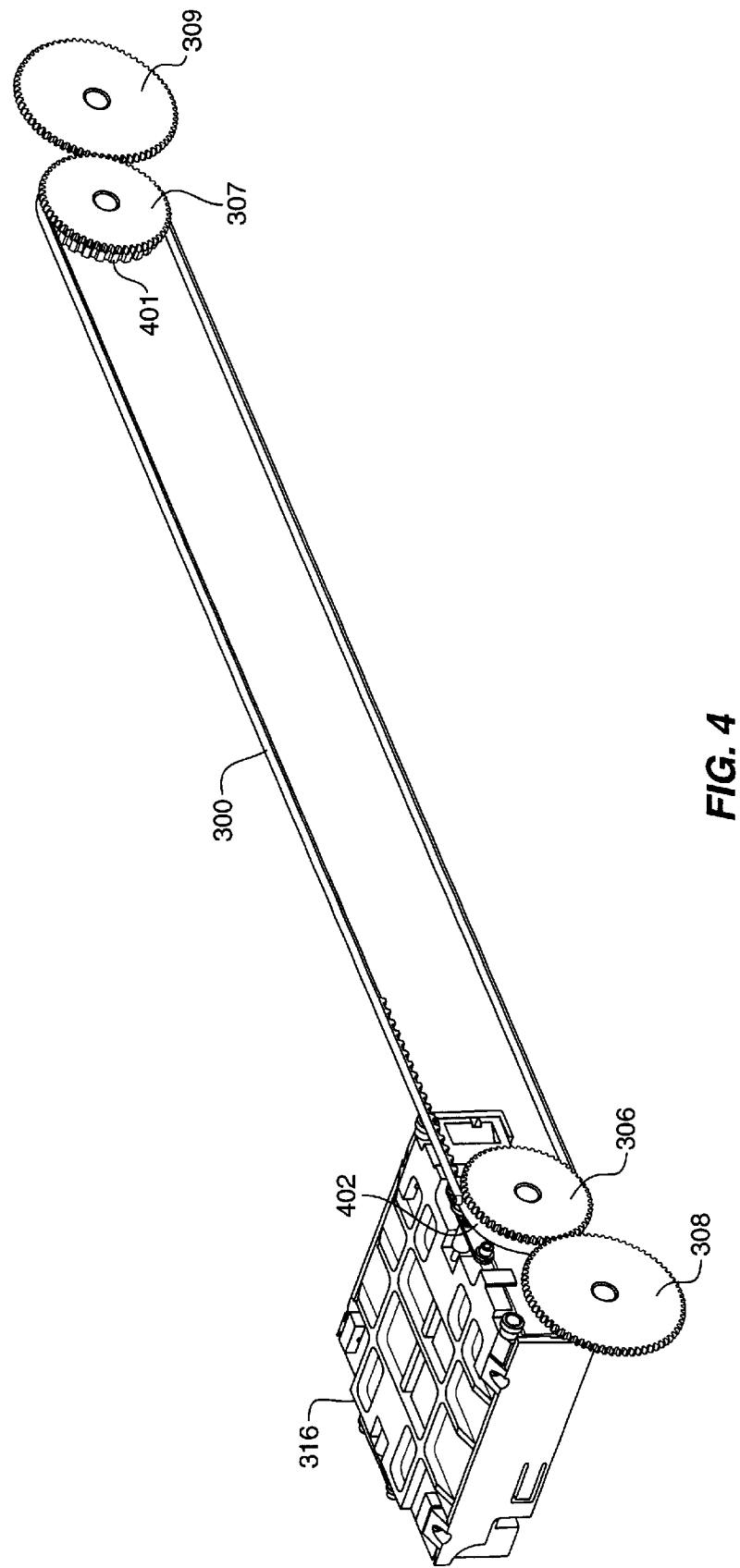
FIG. 4 illustrates a partial perspective view of a transport mechanism for the tape cartridge transport magazine according to the present invention.

Referring to FIG. 4, the gear assembly includes a gear set 306 and 307 coupled to the belt 300. The belt 300 rides on a pulley 402 coupled to the gear 306 and a respective pulley 401 coupled to the gear 307. Since the tape cartridge transport magazines, 103 and 104, are designed to be interchangeable, a drive gear 308 and drive gear 309 is included at each end, 319 and 320, of the magazine 104. This permits operation of the transport mechanism when the magazine 104 is used in the magazine port 108 and when the magazine 104 is flipped for use in the magazine port 109.

Figure 5A:
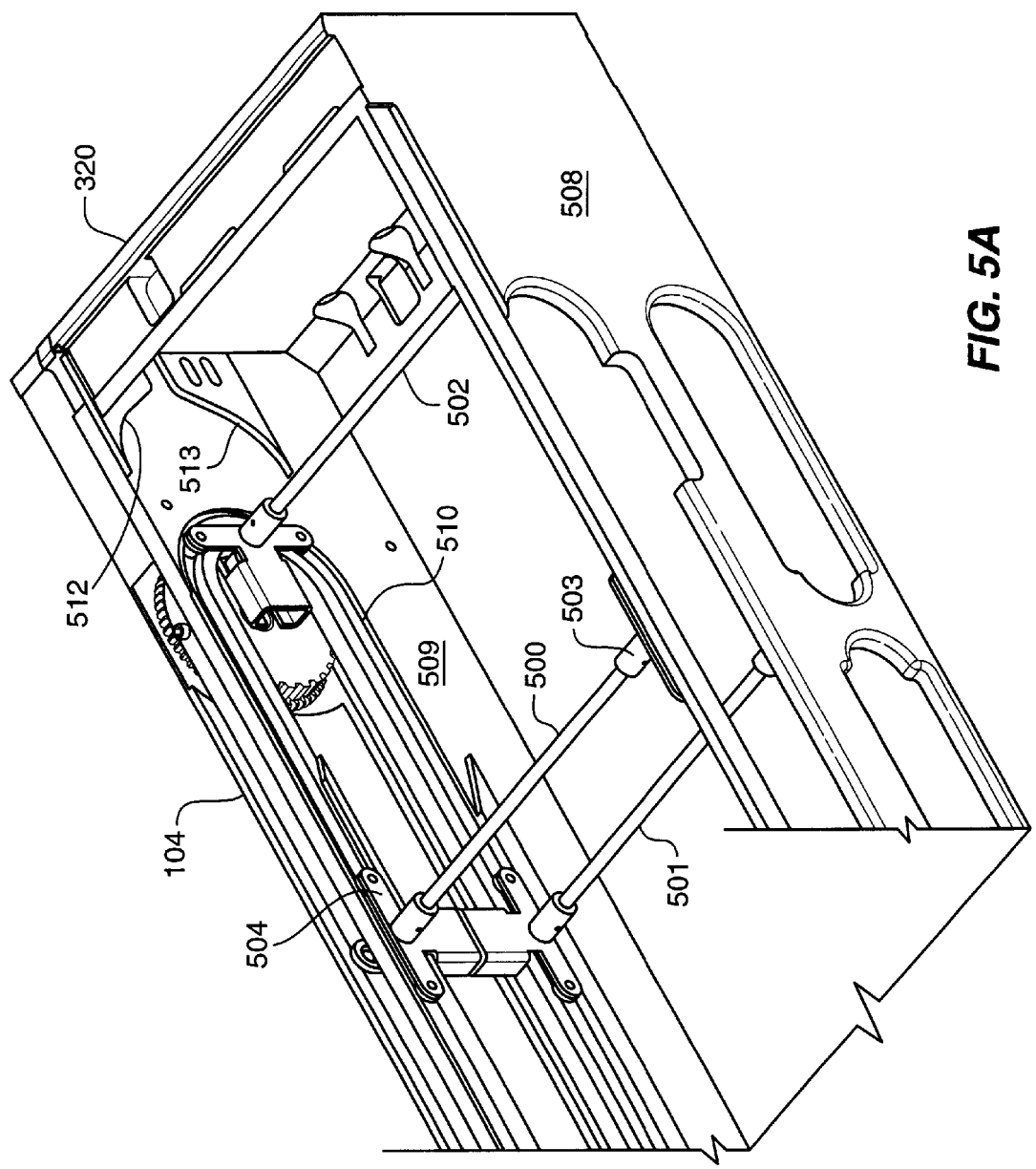
FIG. 5a illustrates an example of a carriage mounting assembly for the tape cartridge transport magazine according to the present invention.
Figure 5B:
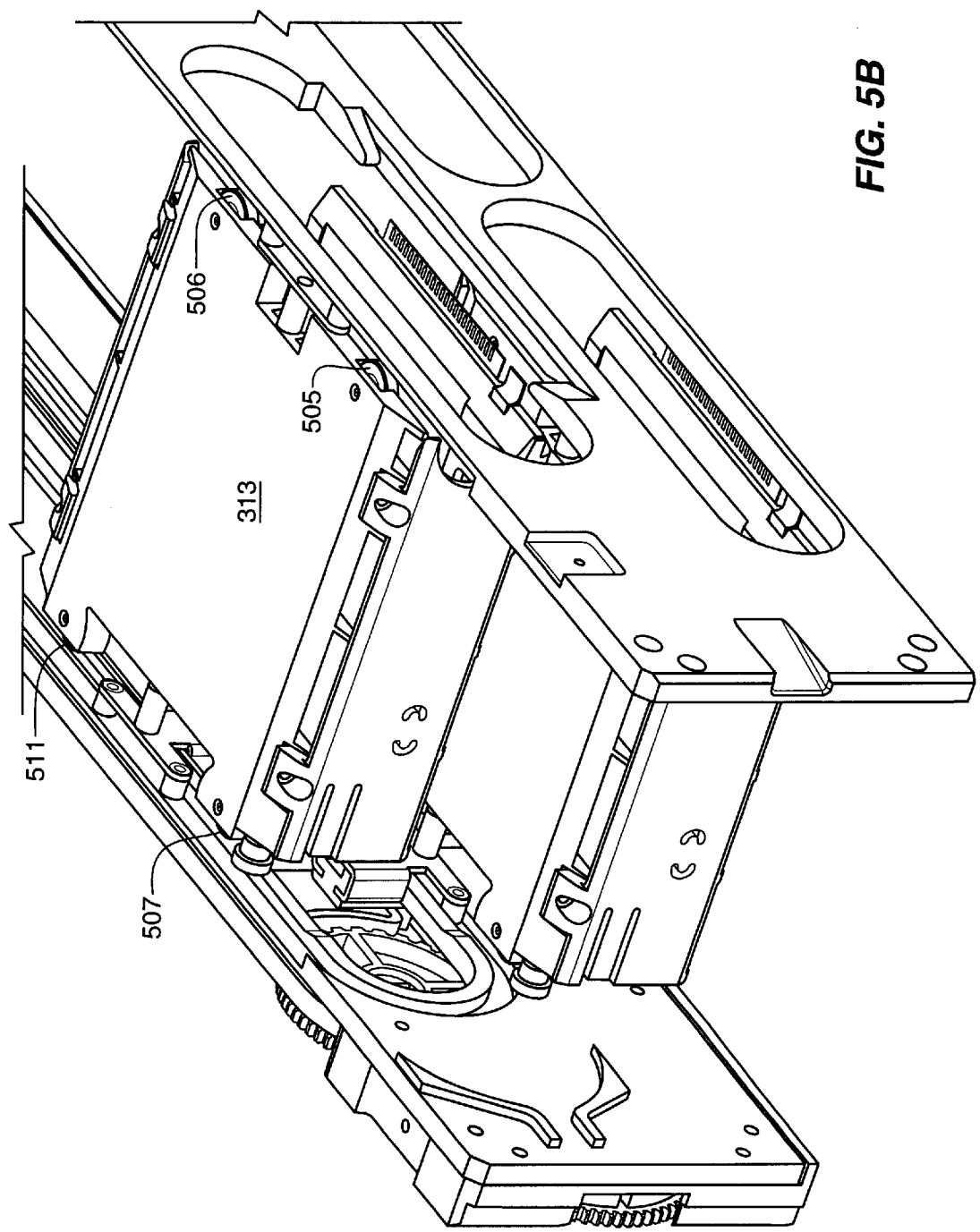
FIG. 5b illustrates an example of the carriage mounting assembly including the carriage for the tape cartridge transport magazine according to the present invention.
Figure 6:
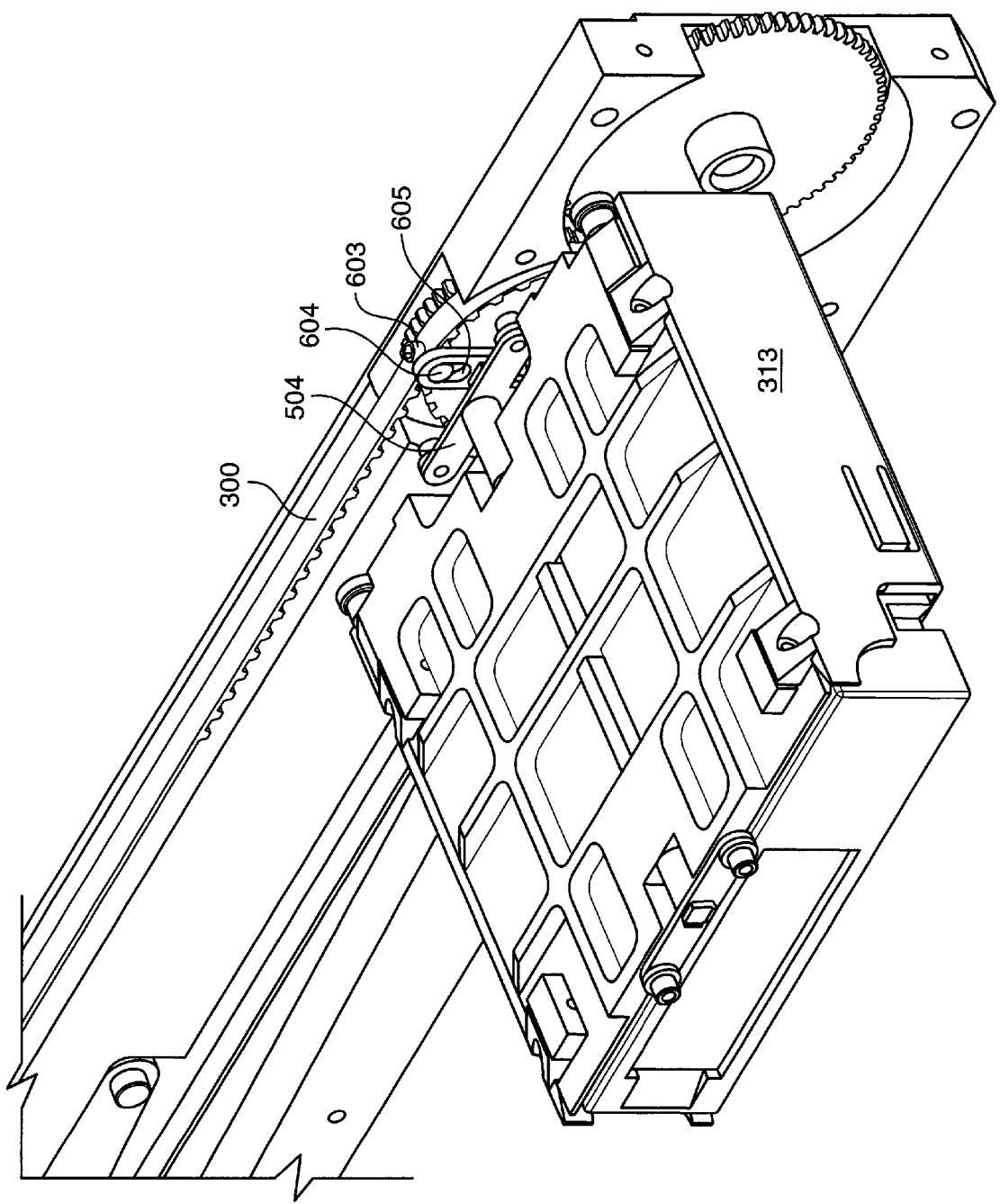
FIG. 6 illustrates additional details of the carriage mounting assembly including the carriage for the tape cartridge transport magazine according to the present invention.

Referring to FIGS. 5a, 5b, and FIG. 6, the carriages 313–316 are rotatably connected to mounting assemblies, e.g. 500–502. The mounting assemblies 500–502 travel in a pair of opposing tracks formed in the walls, 508 and 509, of the magazine 104, as exemplified by track 510 in wall 509. The mounting assemblies, e.g. assembly 500, each comprise a pair of wheeled apparatus, 503 and 504, interconnected by a bar 500. The wheeled apparatus 504 is connected to the belt 300 by the fastener 603 connected to bearing 604. Bearing 604 snaps into aperture 605 defined in the wheeled apparatus 504 and rotates slightly in aperture 605 as the carriage 313 rounds the corner from the top portion 311 to the bottom portion 312 of the magazine 104. The carriages 313–316 each include a first set of wheels as exemplified by wheels 505, 506, 507, and 511 on carriage 313 that operate to eliminate translation play in the carriages 313–316 as they travel in the vertical closed loop within the magazine 104. As will become apparent from the following description, the carriages 313–316 also include a second set of wheels that facilitate transfer of the carriage around the corner from the top portion 311 to the bottom portions 312 of the magazine 104.

The belt 300 and carriages 313–316 are moved in the closed vertical loop by a motor. In this illustrated example, the magazine 104 is a passive mechanism, in that it is not powered internally, but rather, the motor 208 (shown in FIG. 2) is located in the rear of the magazine port 108 and mates with the drive gear 309 when the magazine 104 is inserted into port 108. Another motor, not shown is included in the magazine port 109 and mates with the drive gear 308 when the magazine 104 is inserted into port 108. Optionally, the motors, e.g. 208 could be located within tape cartridge transport magazines, 103 and 104, and interconnect with electrical contacts located in the magazine ports, 108 and 109, when the tape cartridge transport magazines, 103 and 104, are inserted therein.

Figure 10B:
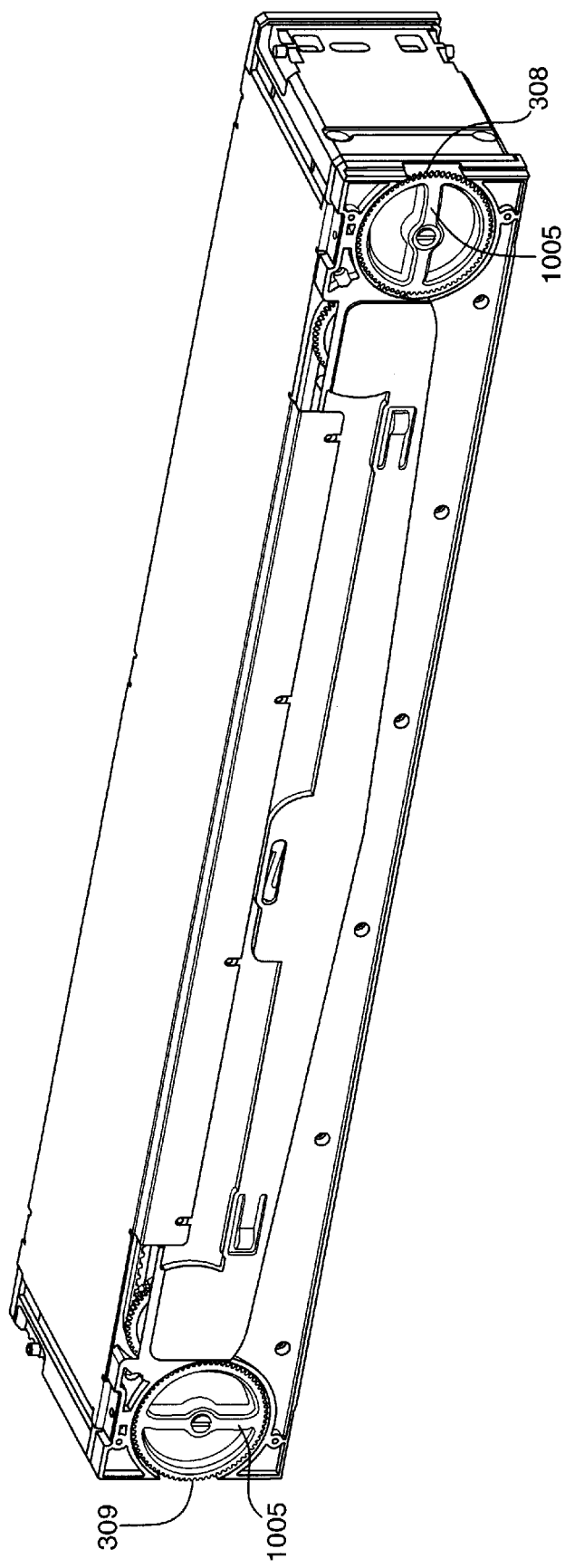
FIG. 10b illustrates a rear perspective view of the tape cartridge transport magazine according to the present invention.

Referring to FIGS. 10a and 10b, the drive gears 308 and 309 include handles 1005 and 1006 respectively. The handles 1005 and 1006 permit a user to rotate the cartridges and carriages through the magazine 104 when the magazine 104 is removed from the autoloader/library system 100. This permits inventorying cartridges and loading and unloading cartridges from the magazine 104. A portion of the drive gears, 308 or 309, is also exposed in the assembled magazine 104 to permit the drive gears 308 and 309 to couple with the motors, e.g. 208 in the magazine ports 108 and 109. When the motor 208 is powered, the carriages 313–316 travel along the top portion 311 of the magazine 104 until they are passed to the bottom portion 312 of the magazine 104. The motor 208 operates in both a forward and reverse direction. Advantageously, this permits the most efficient positioning of a tape cartridge, e.g. 106, for selection and retrieval by the cartridge picker 102. For example, if the desired tape cartridge is currently in the carriage 313 at the storage location 205, the transport mechanism operates in a counterclockwise direction to move the carriage 313 to the storage location 204 for retrieval by the cartridge picker 102. Similarly, if the desired tape cartridge is currently in the carriage 313 at the storage location 203, the transport mechanism operates in a clockwise direction to move the carriage 313 to the storage location 204 for retrieval by the cartridge picker 102.

Figure 7:
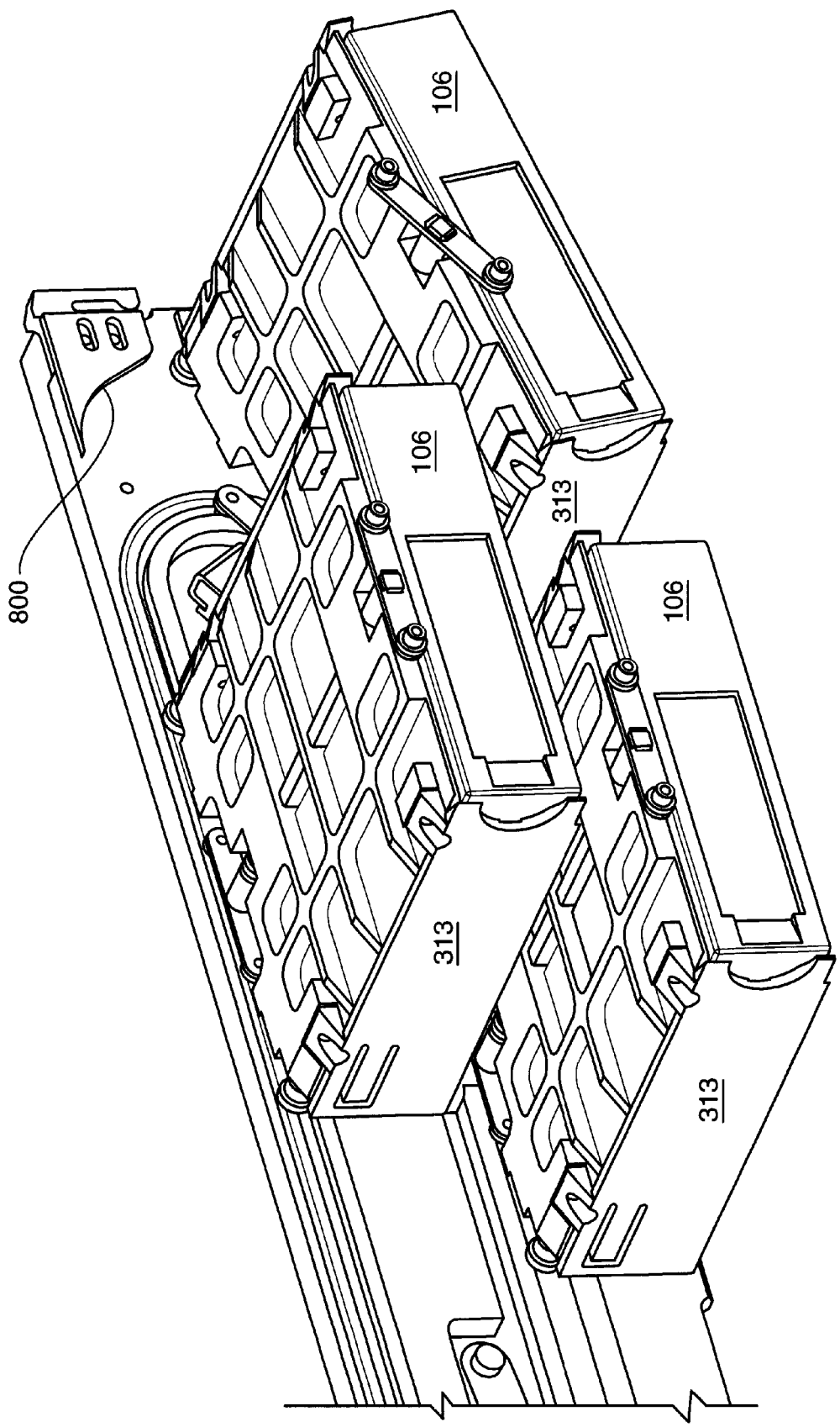
FIG. 7 illustrates an example of the carriage positions during operation of the tape cartridge transport magazine according to the present invention.

As the belt 300 travels around the pulleys 401 and 402, the wheeled assemblies, e.g. 504, remain connected to the belt 300. As the carriage 313 rounds the corner from the top portion 311 to the bottom portion 312 of the magazine, the wheeled assemblies, e.g. 503 and 504, rotate around the bar 500 in the tracks, e.g. track 510. Advantageously, the carriages 313–316 are not flipped or re-oriented as they travel within the magazine 104. This permits proper positioning of the contained tape cartridges for retrieval by the picker 102. FIG. 7 illustrates the various positions of the carriage 313 as the carriage 313 travels from the top portion 311 to the bottom portion 312 of the magazine 104.

Figure 8:
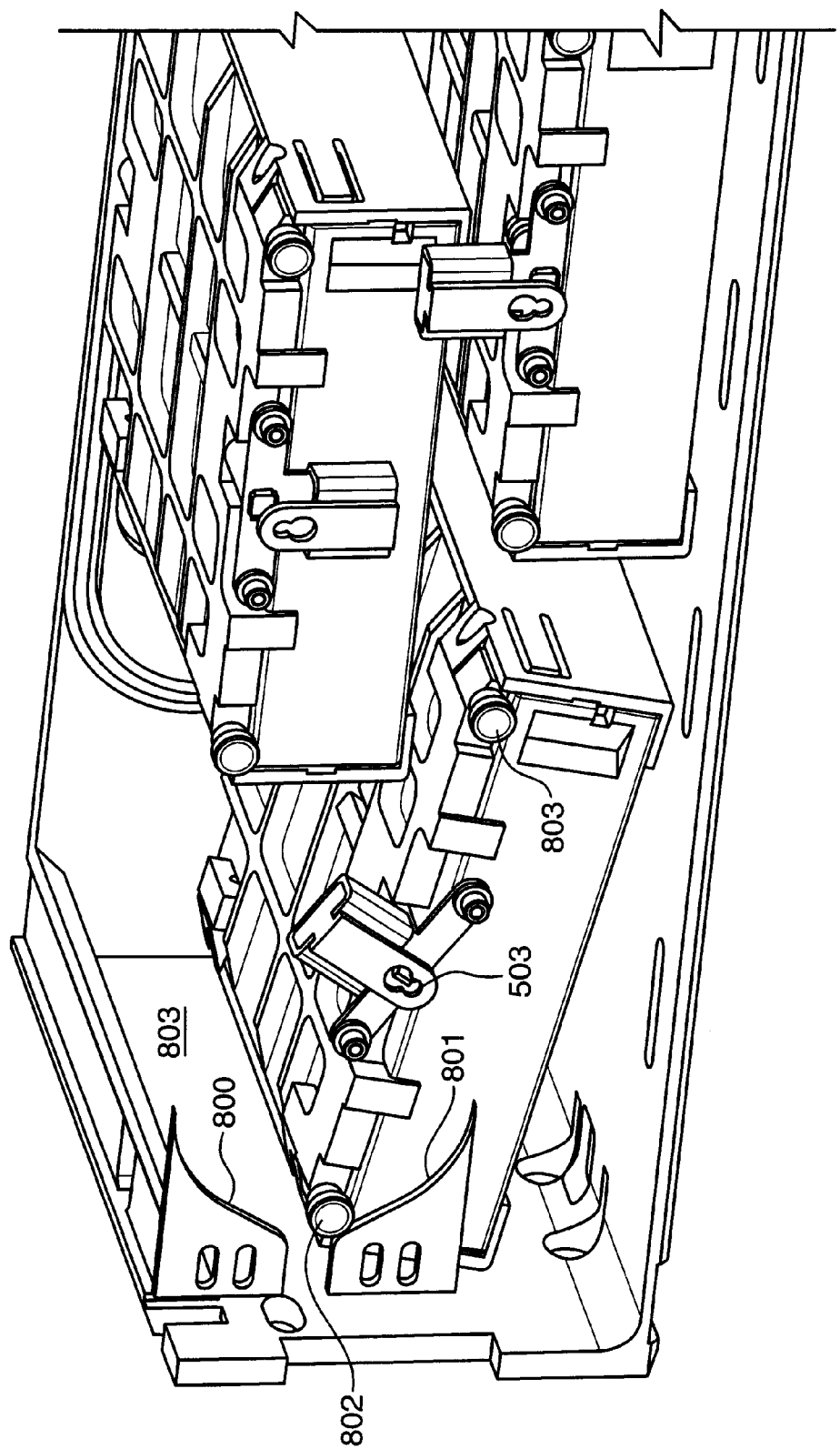
FIG. 8 illustrates another example of the carriage positions during operation of the tape cartridge transport magazine according to the present invention.

The carriages 313–316 also include a second pair of wheels, as exemplified by wheels 802 and 803, on the carriage 313, shown in FIG. 8. The wheels 802 and 803 travel in guide tracks, 800 and 801 and facilitate the transfer of the carriage from the top portion 311 to the bottom portion 312 of the magazine 104. The guide tracks 800 and 801 are connected to the back wall 803 of the magazine 104, and in combination with the wheels, 802 and 803, guide and support the carriage 313 as the carriage 313 travels from the top portion 311 to the bottom portion 312. The additional support provided by the tracks, 800 and 801, prevent binding as the carriage 313 and the wheeled assemblies, e.g. 503 and 504, round the corner from the top portion 311 to the bottom portion 312. The tracks 800 and 801 also orient the carriages 313–316 as they enter the corners so that as an individual carriage, e.g. 313, rounds the corner it is clear of the other carriages 314–316. Similarly, when the transport mechanism is operated in the opposite direction, the tracks 800 and 801 support the end of the carriage 313 to prevent binding as the carriage 313 rounds the corner from the bottom portion 312 to the top portion 311 of the magazine 104. An identical pair of guide tracks, e.g. 800 and 801, are also included in the opposing end of the magazine 104 to guide and support the carriages as they round the opposing corner from the bottom portion 312 to the top portion 311 or top portion 311 to bottom portion 312. Advantageously, the transportation of the carriages 313–316 within the magazines 104 permits any one of the individual carriages 313–316 and corresponding tape cartridge, e.g. 106, to be positioned at any one of the storage locations 200–207.

Figure 11:
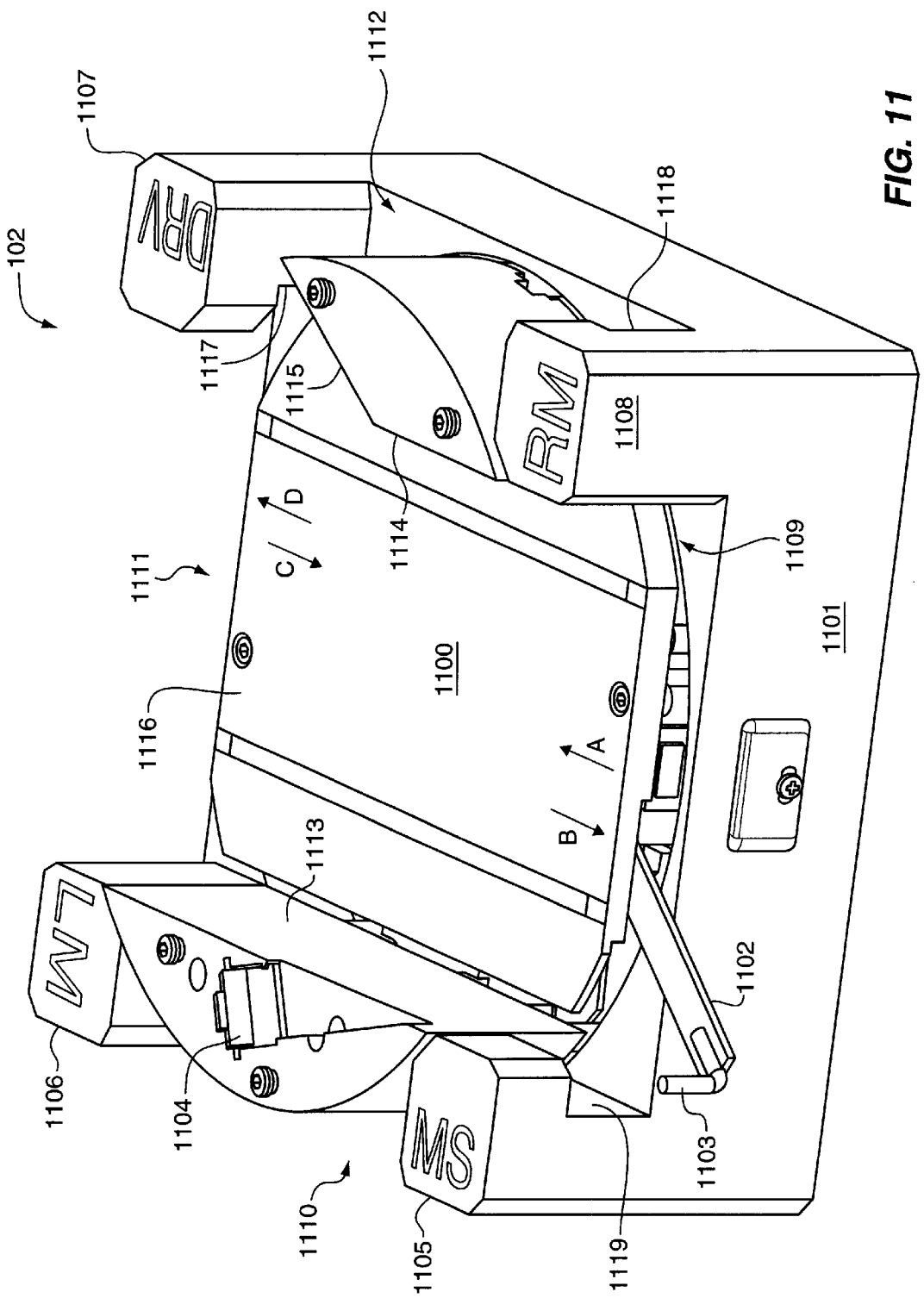
FIG. 11 illustrates an example of a cartridge picker configured to operate with the tape cartridge transport magazine according to the present invention.

The Cartridge Picker FIG. 11

The following description of the cartridge picker 102 is provided so that the operation and advantages of the present tape cartridge magazine can be fully appreciated. The cartridge picker 102 comprises a translation arm 1102 and a turntable 1100 rotatably connected to a stationary base 1101. The turntable 1100, includes a central cavity 1116 configured to receive the tape cartridge 106 on the turntable 1100. Parallel walls, 1113 and 1114, and wall 1115 integrally formed at a thirty-degree angle to wall 1114, define the central cavity 1116. The translation arm 1102 comprises a perpendicular cartridge pin 1103 integrally formed in one end. The pin 1103 is configured to engage or seat in a notch 111 formed in the tape cartridge 106.

The cartridge picker 102 also comprises a bar code reader 1104 for reading computer readable indicia on the plurality of tape cartridges. Since the turntable 1100 rotates, the bar code reader 1104 could be located at numerous other locations on the cartridge picker 102 as a matter of design choice. Alternatively, in some applications, the bar code reader 1104 could be separate from the picker 102 and located in the autoloader/library system 100.

The picker base 1101 comprises four vertical columns 1105–1108 that define four cartridge exchange ports 1109–1112. Columns 1105, 1107, and 1108 are undercut in portions 1117–1119 so that the columns 1105, 1107, and 1108 do not interfere with the translation arm 1102 during retrieval and delivery of the tape cartridge 106. Operationally, the turntable 1100 rotates to exchange the tape cartridge 106 with the single cartridge interface 107 the tape drive 101 and the tape cartridge transport magazines, 103 and 104, through the exchange ports 1109–1112. Specifically, the turntable 1100 exchanges the tape cartridge 106 with the magazine 103 through the exchange port 1109, exchanges the tape cartridge 106 with the single cartridge interface 107 through the exchange port 1110, exchanges the tape cartridge 106 with the magazine 104 through the exchange port 1111, and exchanges the tape cartridge 106 with the tape drive 101 through the exchange port 1112.

Operation FIGS. 12–19

When the tape cartridge 106 is exchanged between the cartridge picker 102 and the tape drive 101 or between the cartridge picker 102 and the magazines 103 and 104, the tape cartridge 106 is received in the cavity 1116 in direction (A) and ejected from the cavity 1116 in direction (B), as shown in FIG. 11. In the context of this application this is defined as the front of the turntable 1100. Similarly, when the tape cartridge 106 is exchanged between the cartridge picker 102 and the single cartridge interface 107, the tape cartridge 106 is received in the cavity 1116 from the opposing end of the cavity 1116 in direction (C) and ejected from the cavity 1116 in direction (D). In the context of the present application this is defined as the rear of the turntable 1100.

Figure 12:
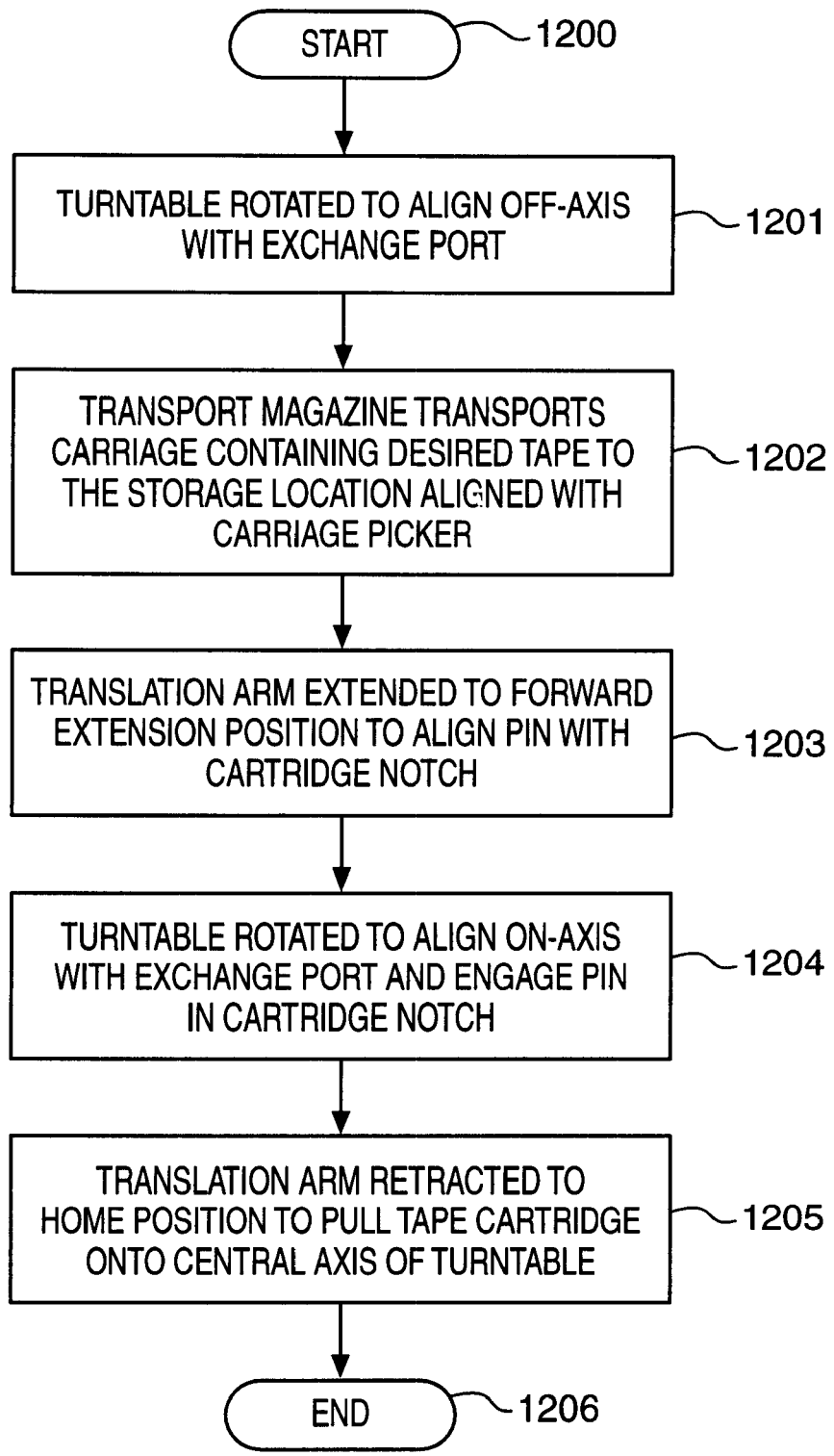
FIG. 12 is a flow chart illustrating an example of the operation of the tape cartridge transport magazine according to the present invention.

FIG. 12 is a flow chart illustrating the operation during retrieval of the tape cartridge 106 from the tape cartridge transport magazine 104. Those skilled in the art will appreciate that the operation is substantially identical for retrieval of the tape cartridge 106 from the tape cartridge transport magazine 103 and for retrieval of the tape cartridge 106 following ejection of the tape cartridge 106 from the tape drive 101.

When a tape cartridge transport magazine, 103 or 104, is inserted into the autoloader/library system 100, the autoloader/library system 100 performs an inventory operation using the sensors as described above to determine which carriages, e.g. 313–316, contain tape cartridges and which carriages are empty. Thus, the autoloader/library system 100 automatically maintains an inventory of loaded tape cartridges during operation. The autoloader/library system 100 also maintains data indicative of the location of the tape cartridges and carriages within the magazines, 103 and 104, so that a desired tape cartridge, e.g. 106, can be provided to the cartridge picker 102.

Figure 14A:
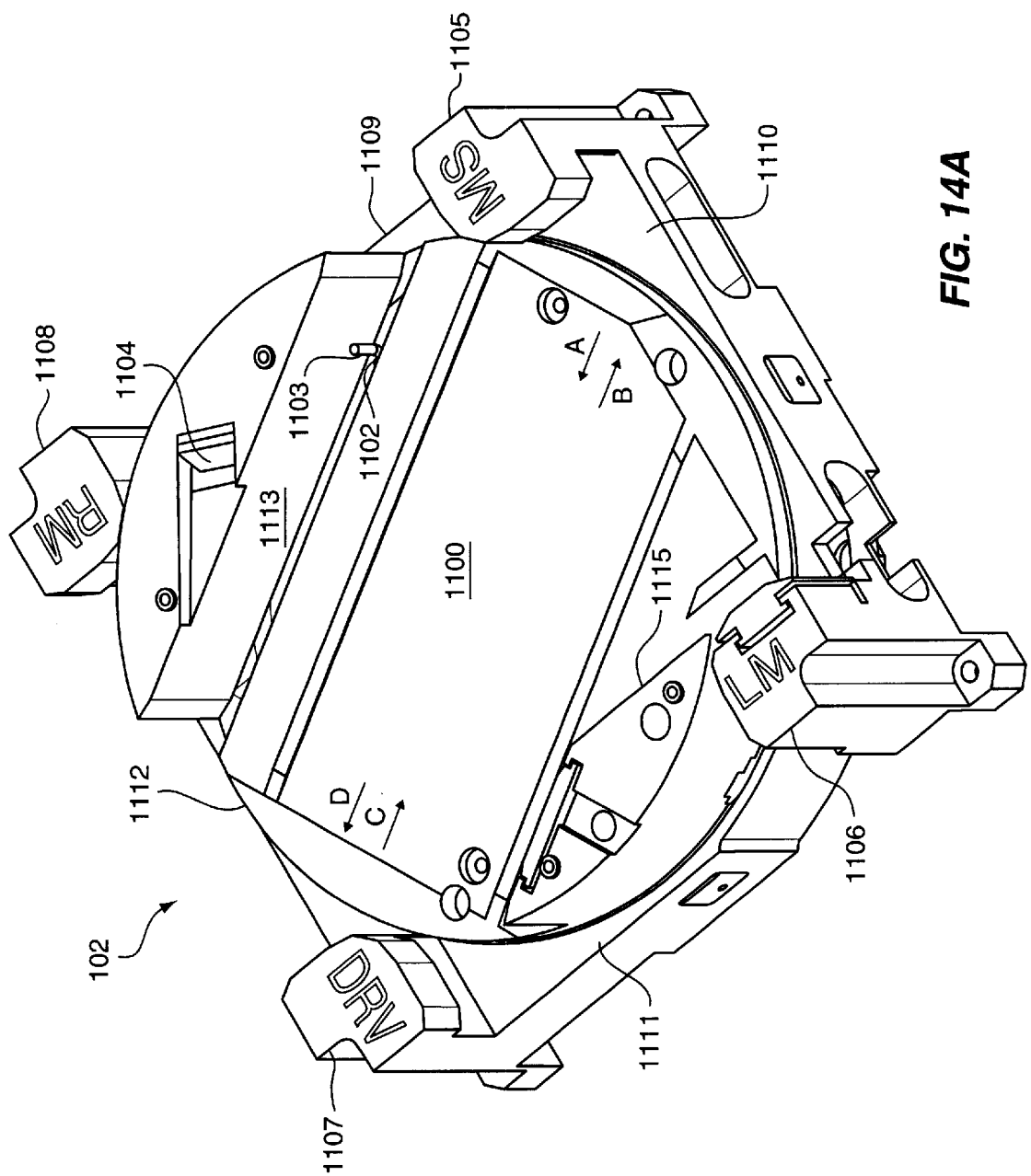
FIG. 14a is an example of a tape cartridge picker during retrieval of the tape cartridge from a tape cartridge transport magazine according to the present invention.
Figure 14B:
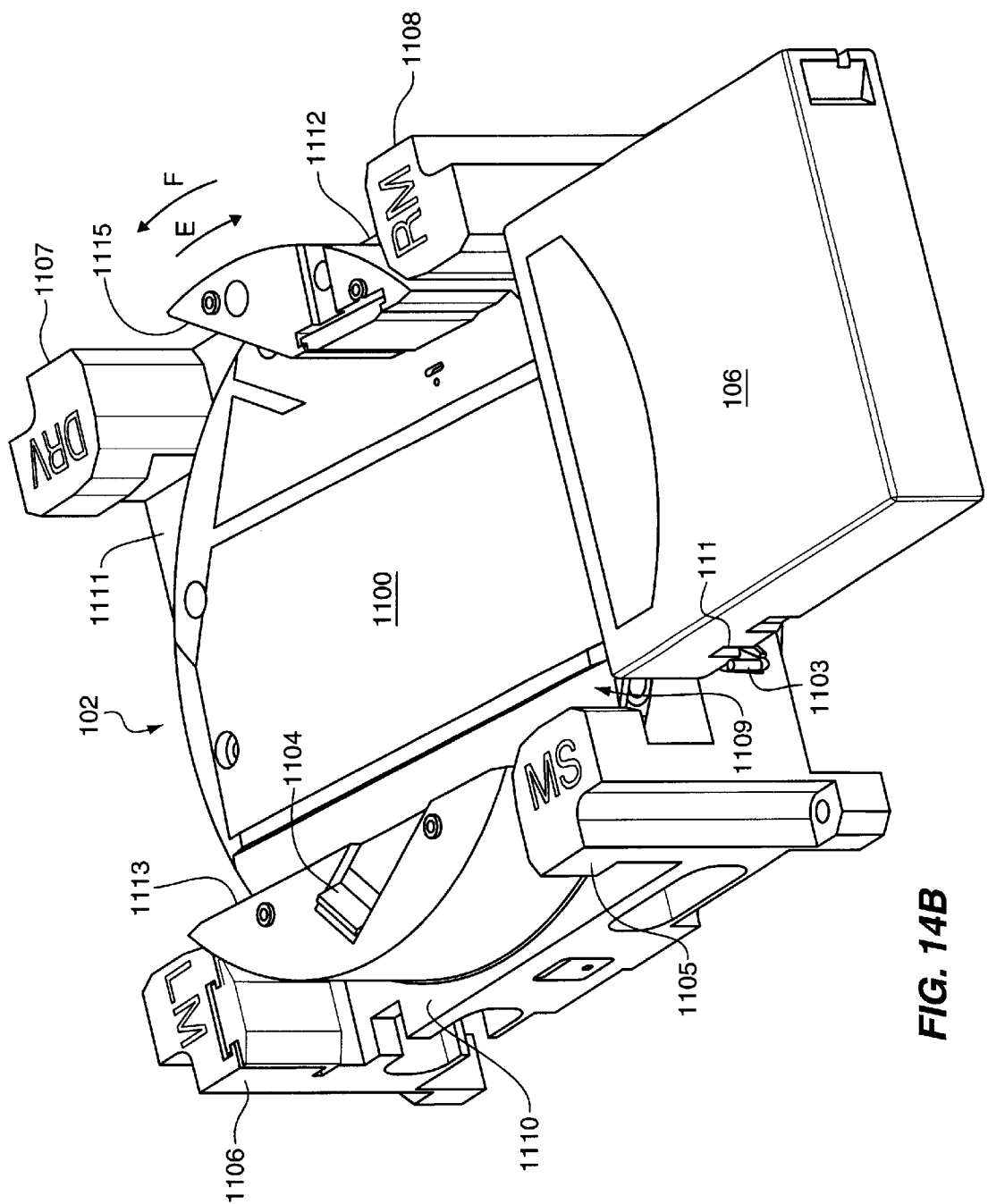
FIG. 14b is another example of a tape cartridge picker during retrieval of the tape cartridge from a tape cartridge transport magazine according to the present invention.

On FIG. 12 the operation begins at step 1200 with the translation arm 1102 in the home position of FIG. 14a. At step 1201, the turntable 1100 is rotated to align off-axis with the exchange port 1109 and the magazine 104, as illustrated in FIG. 14b. The off-axis alignment is defined as any position of the turntable 1100 where either the rear of the turntable 1100 or the front of the turntable 1100 is not directly aligned with one of the exchange ports 1109–1112. An on-axis alignment is defined as any position of the turntable 1100 where either the rear of the turntable 1100 or the front of the turntable 1100 is aligned with one of the exchange ports 1109–1112. An example of the on axis alignment is illustrated in FIG. 11 by the on axis alignment with exchange port 1109. In this case, the off-axis alignment is representative of aligning the front of the turntable 1100 approximately three and one half degrees past the exchange port 1109.

Figure 15:
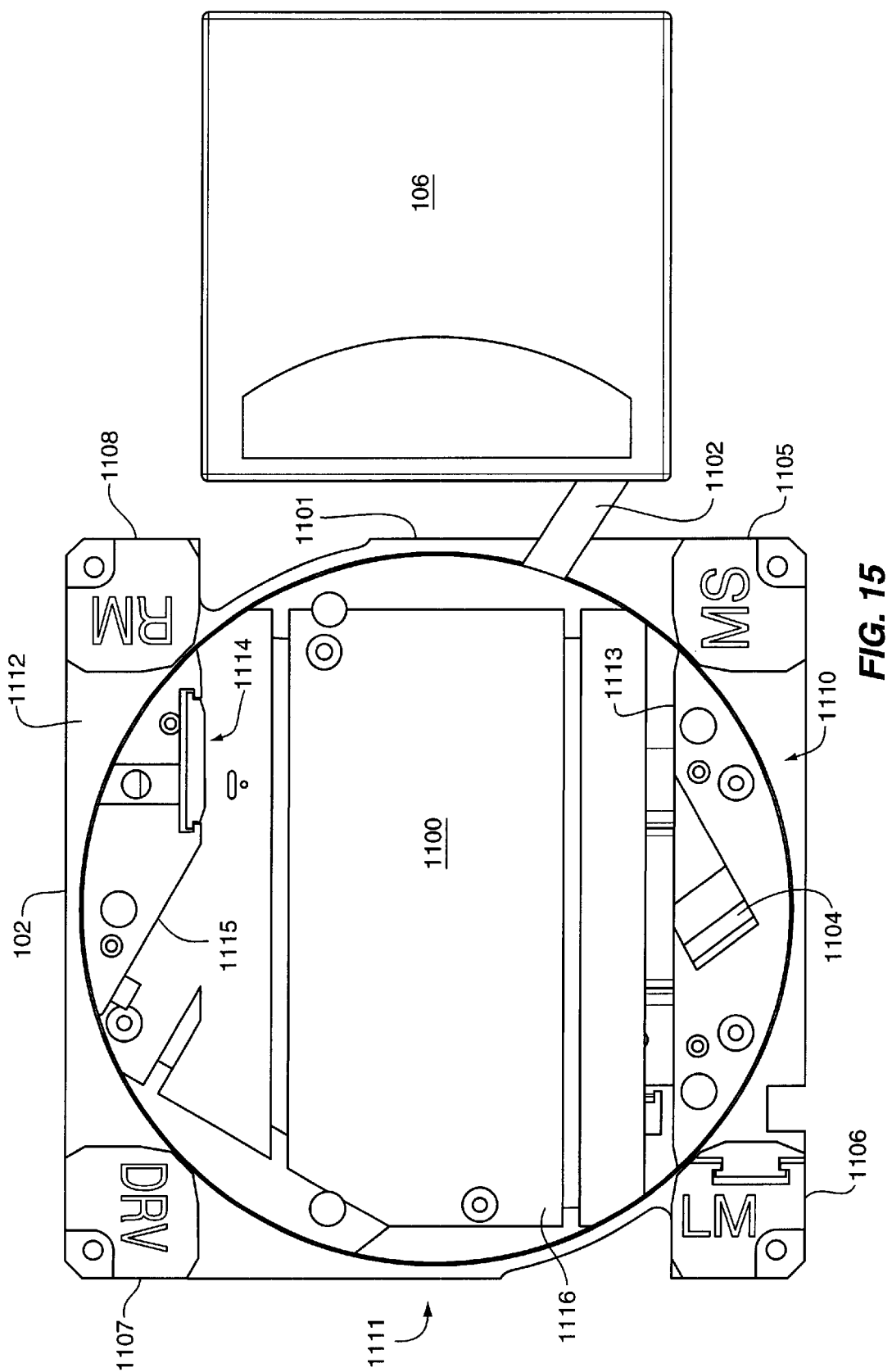
FIG. 15 is another example of the tape cartridge picker during retrieval of the tape cartridge from a tape cartridge transport magazine according to the present invention.
Figure 16:
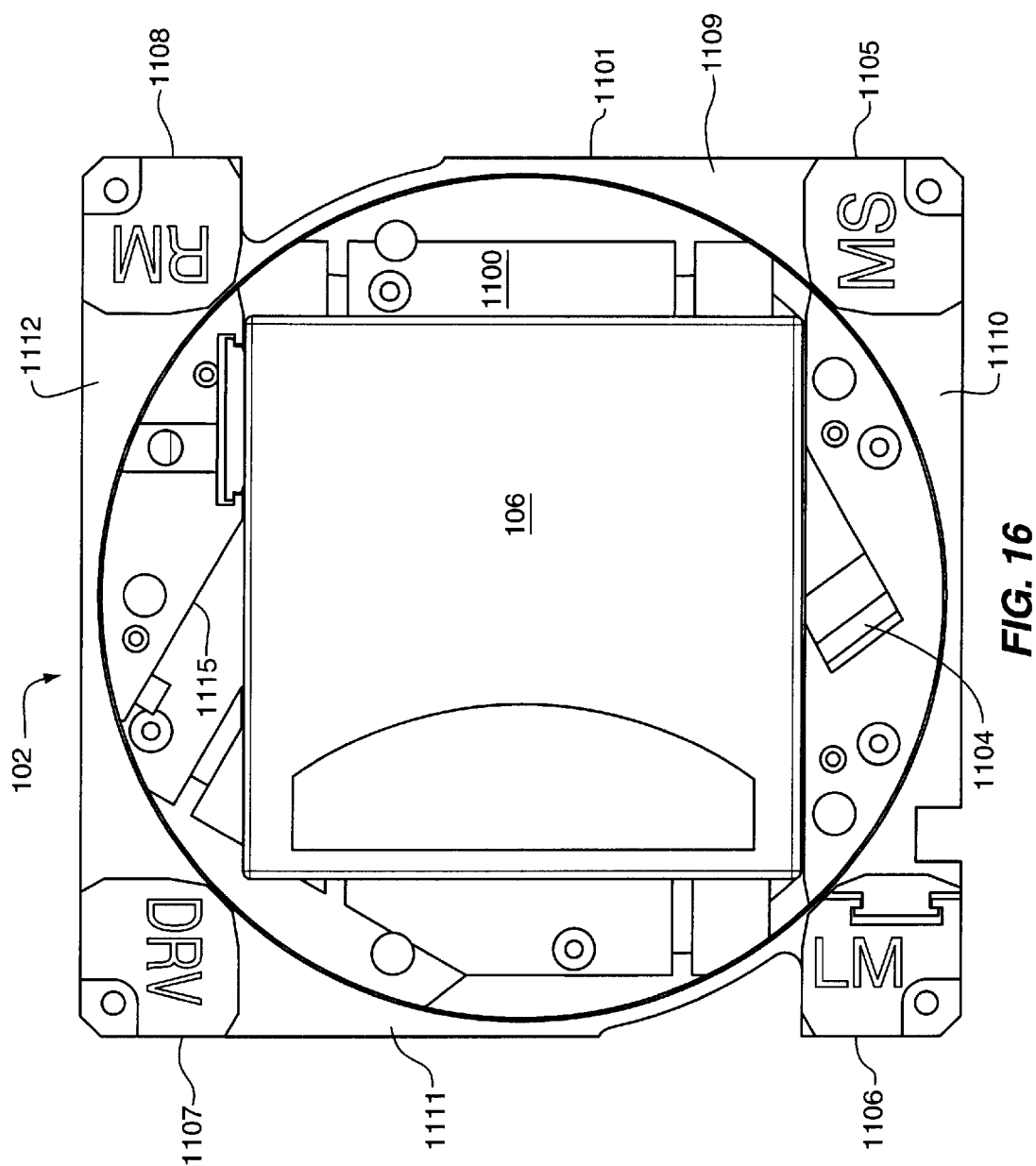
FIG. 16 is another example of the tape cartridge picker during retrieval of the tape cartridge from a tape cartridge transport magazine according to the present invention.

Substantially simultaneously, the transport magazine 104 transports the carriage, e.g. 313, containing the desired tape cartridge 106 to the storage location aligned with the cartridge picker 102, at step 1202. At step 1203, the translation arm 1102 is extended to the forward extension position of FIG. 11 so that the pin 1103 is aligned with the cartridge notch 111 in the tape cartridge 106. It should be noted that the off-axis alignment with the exchange port 1109 permits extension of the translation arm 1102 to the forward extension position without interfering with the tape cartridge 106. At step 1204, the turntable is rotated three and one half degrees to align the front of the turntable 1100 on-axis with the exchange port 1109 and engage or seat the pin 1103 in the cartridge notch 111 as shown in FIG. 15. At step 1205, the translation arm 1102 is retracted to the home position of FIG. 14a to pull the tape cartridge 106 into the cavity 1116 and onto the central axis of the turntable 1100, as shown in FIG. 16. The operation ends at step 1206. Advantageously, once in this position, the turntable 1100 including the cartridge 106 may be freely rotated to deliver the tape cartridge 106 to the tape drive 101, the magazine 103, or the single cartridge interface 107.

Figure 13:
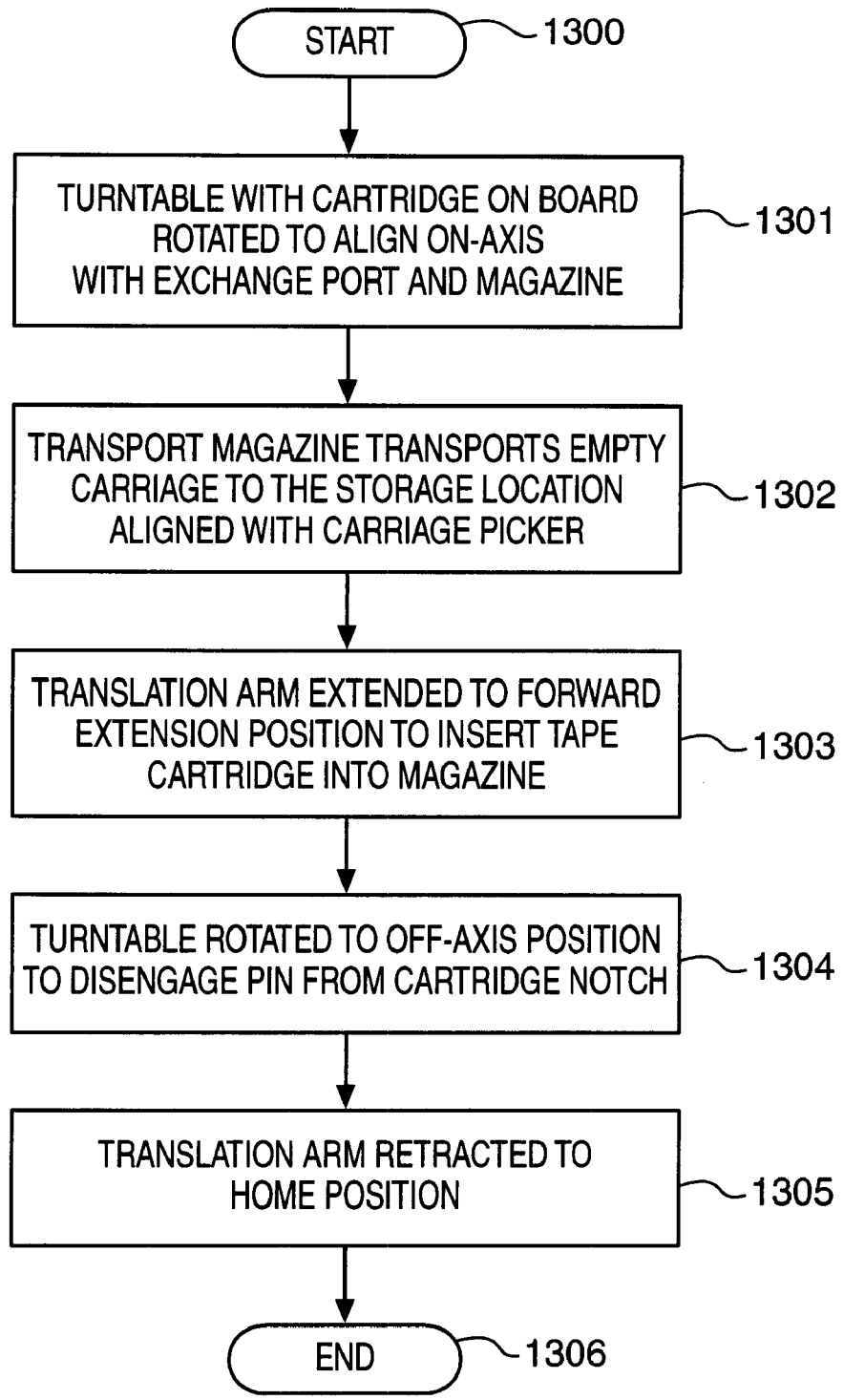
FIG. 13 is a flow chart illustrating another example of the operation of the tape cartridge transport magazine according to the present invention.

FIG. 13 is a flow chart illustrating the delivery of the tape cartridge 106 to the tape cartridge transport magazine 103. Those skilled in the art will appreciate that the operation is substantially identical for delivery of the tape cartridge 106 to the tape cartridge transport magazine 104.

The operation begins at step 1300 with the tape cartridge 106 loaded onto the cartridge picker 102 as shown in FIG. 16. At step 1301, the turntable 1100 is rotated to align the front of the turntable on-axis with the exchange port 1111 and the tape cartridge transport magazine 103. Substantially simultaneously, the transport magazine 104 transports an empty carriage, e.g. 314, to the storage location aligned with the cartridge picker 102 at step 1302. At step 1303, the translation arm 1102 is extended to the forward extension position to insert the tape cartridge 106 into the carriage 314, as exemplified by FIG. 15. At step 1304, the turntable 1100 is again rotated to the three and one half degrees off-axis position to disengage the pin 1103 from the cartridge notch 111. At step 1305, the translation arm is retracted to the home position of FIG. 14a, so that the turntable 1100 is free to rotate and perform additional operations. The operation ends at step 1306.

Figure 17:
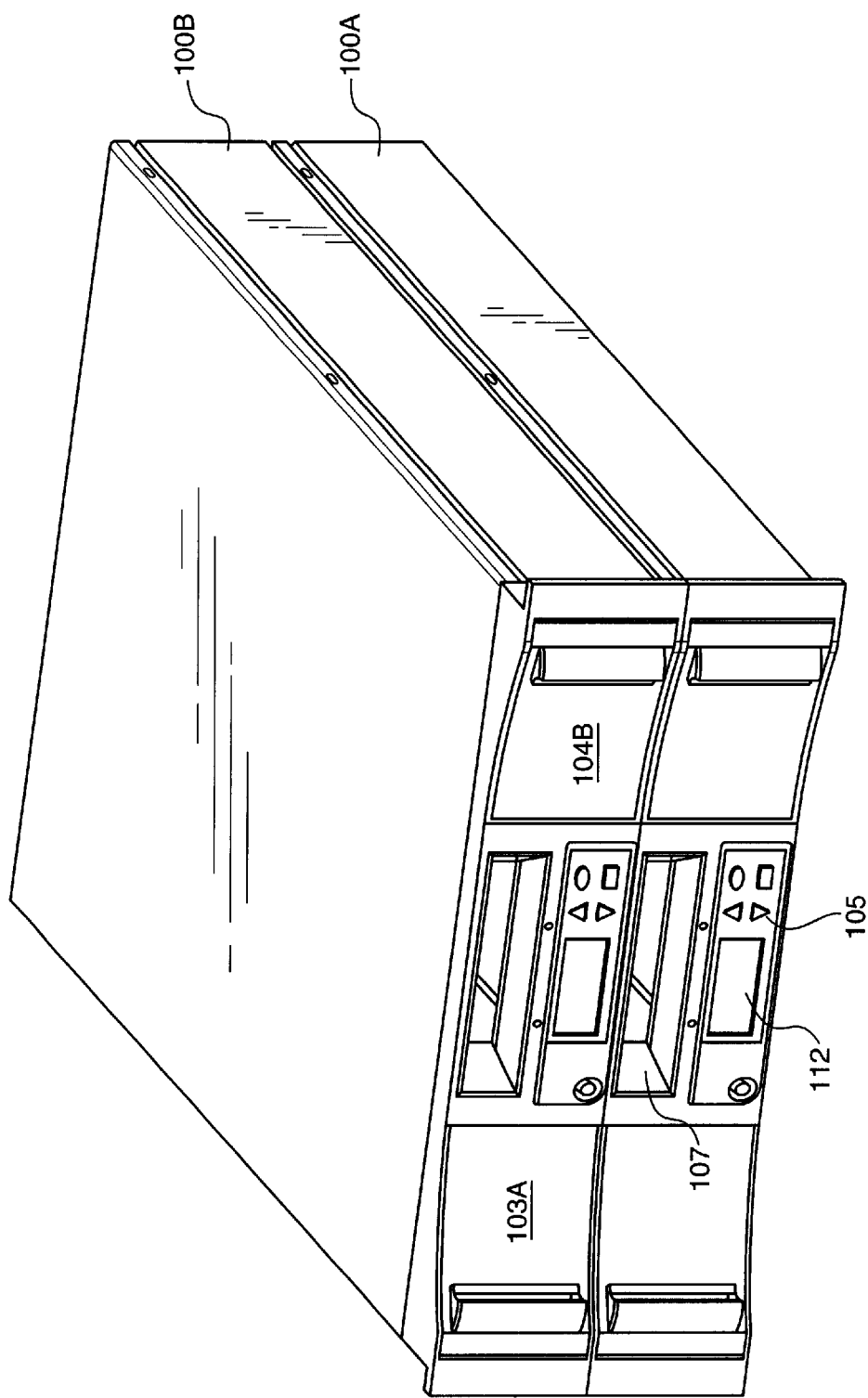
FIG. 17 illustrates a stacked configuration of the autoloader/library system.

Expansion of Tape Autoloader/Library Systems—FIG. 17

FIG. 17 illustrates multiple autoloader library systems in a stacked configuration. Those skilled in the art will appreciate that an infinite number of autoloader library systems could be stacked although only library systems 100(a) and 100(b) are shown on FIG. 17 for clarity.

The autoloader/library system 100 is configured to mechanically and electrically interconnect with other substantially identical autoloader/library systems by stacking multiple autoloader/library systems to provide expandability and scalability as a matter of design choice. Once coupled, the multiple autoloader/library systems 100(a) and 100(b) can share individual tape cartridges, e.g. 106, to provide efficient load balancing and performance between the coupled autoloader/library systems. The coupled autoloader/library systems 100(a) and 100(b) could each include a cartridge picker 102, tape cartridge transport magazines, 103 and 104, a tape drive 101, and a single cartridge interface 107, or could share elements such as the cartridge picker 102, the single cartridge interface and/or the tape drive 101. Alternatively, a single cartridge picker 102 configured with an elevator mechanism could serve both autoloader/library systems 100(a) and 100(b). In addition, the coupled autoloader/library systems 100(a) and 100(b) could each include an individual control panel 105 and interface 112 or could share a single control panel, e.g. 105, and interface, e.g. 112. In the case where the library systems, e.g. 100, are coupled, the cartridge picker 102 is configured to not only rotate but is also configured to elevate within the multiple library systems, 100(a) and 100(b), to access magazines, 103(a) and 104(b).

In another example, the library systems, 100(a) and 100(b), could share the single cartridge interface 107. In this case the single cartridge interface 107 is configured with an elevator mechanism to transport the single cartridge interface 107 in the vertical direction between the multiple library systems, 100(a) and 100(b). Operationally, the cartridge picker 102 in the system 100(a) could pass tape cartridges to the single cartridge interface 107. The single cartridge interface 107 then elevates to the system 100(b) where the tape cartridge is automatically passed to a cartridge picker, e.g. 100, in the system 100(b). The cartridge picker in the system 100(b) could then exchange the tape cartridge with the tape drive, e.g. 101 or the magazines, 103(a) and 103(b), in the system 100(b). Cartridges could also be passed from the system 100(b) to the system 100(a) in a similar manner. Thus, the autoloader/library system 100 is customizable to a variety of applications with the capability of expansion at any time to provide both increased capacity and/or increased performance.

The above-described systems could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art can appreciate variations of the above-described embodiments that fall within the scope of the invention. As a result, the invention is not limited to the specific embodiments discussed above, but only by the following claims and their equivalents.

What is claimed is:

1. A tape cartridge transport magazine for an automated tape catridge autoloador library system, the tape cartridge transport magazine comprising:

a housing configured to interface with a magazine port in the tape cartridge autoloader library system;

a plurality of individual carriages within the housing for receiving and storing a plurality of tape cartridges, wherein the plurality of individual carriages are horizontally oriented relative to the housing; and a drive assembly configured to transport the plurality of individual carriages in a vertical closed loop between an upper portion of the housing and a lower portion of the housing, wherein the drive assembly is connected to a first side of each of the plurality of individual carriages, and wherein a tape cartridge is loaded onto an individual carriage through a second side opposite the first side of the individual carriage.

2. The magazine of claim 1 wherein each of the plurality of individual carriages is configured to receive an individual one of the plurality of tape cartridges.

3. The magazine of claim 2 wherein the drive assembly comprises:

at least one drive gear configured to mate with a drive motor; and a belt connected to the plurality of individual carriages and configured to mate with the at least one drive gear.

4. The magazine of claim 3, wherein the drive motor in located in the tape cartridge autoloader library system and is configured to detachably mate with the drive gear when the tape cartridge transport magazine is loaded into the magazine port.

5. The magazine of claim 3, wherein the drive motor is located in the tape cartridge transport magazine.

6. The magazine of claims 3, further comprising:

a plurality of mounting assemblies, each of the plurality of individual carriages is rotatably connected to one of the plurality of mounting assemblies, wherein each of the plurality of mounting assemblies comprises:

a pair of wheeled apparatus that travel in a pair of opposing tracks; and a bar connected to the pair of wheeled apparatus.

7. The magazine of claim 6, wherein the pair of opposing tracks includes:

a pair of upper tracks; and a pair of lower tracks, wherein the pair of wheeled apparatus travels in the pair of upper tracks, then rotate about the bar to travel in the lower tracks.

8. The magazine of claim 6, further comprising:

a fastener connected to the belt;

a bearing connected to the fastener; and an aperture connected to the bearing, wherein the bearing rotates in the aperture, and wherein the aperture is defined in one of the pair of wheeled apparatus.

9. The magazine of claim 3, wherein the drive gear includes a handle for manually rotating the drive gear.

10. The magazine of claim 2 wherein each of the plurality of individual carriages comprises:

a housing configured to receive the individual one of the plurality of tape cartridges;

a slidable flag configured to retract into the housing as a tape cartridge is inserted into the housing and indicate a cartridge present condition when the flag is retracted and a carriage empty condition when the flag is not retracted; and a perforated tab configured to indicate to at least one sensor when the housing is positioned for receipt of the individual tape cartridge from a cartridge picker.

11. The magazine of claim 1 wherein the magazine is configured to slidably interface with a second magazine port in the tape cartridge autoloader library system.

12. The magazine of claim 1, wherein each of the plurality of individual carriages includes:

a wheel at opposite ends of the individual carriage, wherein the wheel travels in the guide tracks to guide the individual carriage at the opposite ends of the housing.

13. A tape cartridge transport magazine for a tape library, the tape cartridge transport magazine comprising:

a rectangular housing configured to interface with a magazine port in the tape library;

a plurality of individual carriages within the housing configured to receive and store a plurality of tape cartridges; and a drive assembly configured to transport the plurality of individual carriages in a loop between at least a first position and a second position vertically displaced relative to each other wherein the drive assembly is connected to a first side of each of the plurality of individual carriages, and wherein a tape cartridge is loaded onto an individual carriage through a second side opposite the first side of the individual carriage.

14. The magazine of claim 13 wherein the plurality of individual carriages comprise: at least two individual carriages.

15. The magazine of claim 13 wherein the plurality of individual carriages comprise: at least eight individual carriages.

16. The magazine of claim 13 wherein each of the plurality of individual carriages is configured to receive an individual one of the plurality of tape cartridges.

17. The magazine of claim 16 wherein the drive assembly includes:

at least one drive gear configured to mate with drive motor and a belt connected to the plurality of individual carriages and configured to mate with the at least one drive gear.

18. The magazine of claim 17, wherein the drive motor is located in the tape cartridge autoloader library system and is configured detachably mate with the drive gear when the tape cartridge transport magazine is loaded into the magazine port.

19. The magazine of claim 17, wherein the drive motor is located in the tape cartridge transport magazine.

20. The magazine of claim 16 wherein each of the plurality of individual carriages comprises:

a housing configured to receive the individual one of the plurality of tape cartridges;

a slidable flag configured to retract into the housing as a tape cartridge is inserted into the housing and indicate a cartridge present condition when the flag is retracted and a carriage empty condition when the flag is not retracted; and a perforated tab configured to indicate to at least one sensor when the housing is positioned for receipt of the individual tape cartridge.

21. The magazine of claim 13 wherein the magazine is configured to slidably interface with a second magazine port in the tape cartridge autoloader library system.

22. A method of operating a tape cartridge transport magazine, the method comprising:

inserting a plurality of tape cartridges into a plurality of individual carriages in the tape cartridge transport magazine;

inserting the tape cartridge transport magazine into a first magazine port in a tape cartridge autoloader library system; and transporting the plurality of tape cartridges on the plurality of individual carriages between vertically displaced first and second positions within the magazine to position an individual one of the plurality of tape cartridges for selection by a cartridge picker, wherein a drive assembly is connected to a first side of each of the plurality of individual carriages, and wherein a tape cartridge is inserted into an individual carriage through a second side opposite the first side of the individual carriage.

23. The method of claim 22 the method further comprising;

transporting the plurality of individual carriages in a closed loop within the tape cartridge transport magazine to inventory the plurality of tape cartridges inserted into the tape cartridge magazine.

24. The method of claim 22, the method further comprising:

transporting the plurality of individual carriages between the vertically displaced first and second positions within the tape cartridge transport magazine to position an empty individual carriage for delivery of one of the plurality of tape cartridge to the empty individual carriage by the cartridge picker.

25. The method of claim 22, the method further comprising:

removing the tape cartridge transport magazine form the first magazine port in the tape cartridge autoloader library system;

inserting the tape cartridge transport magazine into a second magazine port in the tape cartridge autoloader library system; and transporting the plurality of tape cartridges on the plurality of individual carriages between the vertically displaced first and second positions within the tape cartridge transport magazine to position the individual one of the plurality of tape cartridges for selection by the cartridge picker.

26. A tape cartridge transport magazine for an automated tape cartridge autoloader library system, the tape cartridge transport magazine comprising:

a housing configured to interface with a magazine port in the tape cartridge autoloader library system;

a plurality of storage locations horizontally oriented within the housing for receiving and storing a plurality of tape cartridges, wherein at least one of the storage locations comprises:

a slidable flag to retract into the at least one storage location as a tape cartridge is inserted to indicate a cartridge present condition when the flag is retracted and an empty condition when the flag is not retracted; and a perforated tab to indicate when the at least one storage location is positioned to receive a tape cartridge from a cartridge picker; and means for transporting the plurality of storage locations within the housing between an upper portion of the housing and a lower portion of the housing.

27. The magazine of claim 26, wherein the plurality of storage locations comprise:

a plurality of individual carriages connected to the transporting means, wherein each of the plurality of individual carriages is configured to receive an individual one of the plurality of tape cartridges.

28. The magazine of claim 27 wherein the transporting means comprises:

a drive assembly comprising:

at least one drive gear configured to mate with a drive motor; and a belt connected to the plurality of individual carriages and configured to mate with the at least one drive gear.

29. The magazine of claim 28, wherein the drive motor is located in the tape cartridge autoloader library system and is configured to detachably mate with the drive gear when the tape cartridge transport magazine is loaded into the magazine port.

30. The magazine of claim 28, wherein the drive motor is located in the tape cartridge transport magazine.

31. The magazine of claim 26, wherein the magazine is configured to slidably interface with a second magazine port in the tape cartridge autoloader library system.

32. A method of operating a tape cartridge transport magazine, the method comprising:

inserting a plurality of tape cartridges into a plurality of individual carriages in the tape cartridge transport magazine;

inserting the tape cartridge transport magazine into a first magazine port in a tape cartridge autoloader library system; and transporting the plurality of individual carriages horizontally and vertically within the tape cartridge transport magazine between an upper portion and a lower portion of the magazine to position an individual one of the plurality of tape cartridges for selection by a cartridge picker, wherein a drive assembly is connected to a first side of each of the plurality of individual carriages, and wherein a tape cartridge is inserted into an individual carriage through a second side opposite the first side of the individual carriage.

33. The method of claim 32 the method further comprising:

transporting the plurality of tape cartridges within the tape cartridge transport magazine between the upper portion and lower portion to inventory the plurality of tape cartridges inserted into the tape cartridge magazine.

34. The method of claim 32 the method further comprising:

transporting the plurality of tape cartridges within the tape cartridge transport magazine between the upper portion and lower portion to position an empty individual carriage for delivery of one of the plurality of tape cartridges to the empty individual carriage by the cartridge picker.

35. The method of claim 32 the method further comprising:

removing the tape cartridge transport magazine from the first magazine port in the tape cartridge autoloader library system;

inserting the tape cartridge transport magazine into a second magazine port in the tape cartridge autoloader library system; and transporting the plurality of tape cartridges horizontally and vertically within the tape cartridge transport magazine between the upper portion and lower portion of the magazine to position the individual one of the plurality of tape cartridges for selection by the cartridge picker.

* * * * *

UNITED STATES PATENT AND TRADEMARK OFFICE
CERTIFICATE OF CORRECTION

PATENT NO. : 6,693,758 B2
DATED : February 17, 2004
INVENTOR(S) : Patterson et al.

It is certified that error appears in the above-identified patent and that said Letters Patent is hereby corrected as shown below:

Title page,
Item [56], References Cited, FOREIGN PATENT DOCUMENTS, please include -- EP 1 045 382 --.
Item [75], Inventors, please replace "Dominic John Maglin" with -- Dominic John Maglia --

Column 15,
Line 21, please replace "...transport magazine form...." with -- transport magazine from... --

Signed and Sealed this

Sixth Day of July, 2004

JON W. DUDAS
*Acting Director of the United States Patent and Trademark Office*